US006230032B1

(12) United States Patent
Liljegren

(10) Patent No.: US 6,230,032 B1
(45) Date of Patent: May 8, 2001

(54) METHOD DEVICE AND TERMINAL FOR MOBILE RADIO COMMUNICATION

(75) Inventor: Lars Fredrik Liljegren, Hofterup (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/217,229

(22) Filed: Dec. 21, 1998

(30) Foreign Application Priority Data

Dec. 23, 1997 (SE) .................................................... 9704876

(51) Int. Cl.$^7$ ........................................................ H04B 1/38
(52) U.S. Cl. ........................ 455/572; 455/38.3; 455/573
(58) Field of Search ................................. 455/38.3, 38.4, 455/343, 572, 573, 574, 127; 379/413; 320/128, 136

(56) References Cited

U.S. PATENT DOCUMENTS

| 4,227,257 | * | 10/1980 | Sato ....................................... 455/343 |
| 4,962,543 | | 10/1990 | Kuge et al. ............................. 455/89 |
| 5,542,116 | * | 7/1996 | Schellinger .......................... 455/38.3 |
| 5,684,404 | | 11/1997 | Millar ..................................... 324/426 |
| 5,870,685 | * | 2/1999 | Flynn ..................................... 455/573 |
| 5,946,617 | * | 8/1999 | Portaro et al. ........................ 455/572 |

FOREIGN PATENT DOCUMENTS 6-006283   1/1994 (JP) .

OTHER PUBLICATIONS

Landström, R., International–Type Search Report, Nov. 25, 1998 Search Request No. SE97/01640, pp. 1–3.

* cited by examiner

Primary Examiner—Nay Maung
Assistant Examiner—Quochien B. Vuong
(74) Attorney, Agent, or Firm—Jenkens & Gilchrist, P.C.

(57) ABSTRACT

The present invention relates to mobile radio communication. More particularly, the invention relates to a method, a device and a terminal (10) for mobile radio communication, which comprises an antenna unit (102), a radio portion (104), a control unit (120), a unit (122) for storing of control programs, a unit (124) for storing of data, a keypad unit (110), a display unit (112), a power supply unit (12) which is the sole common storing unit for electrical charge, a means (26) for sensing the electrical charge in the power supply unit (12) and for determining a matched measuring signal (CL) which corresponds to the electrical charge of the power supply unit, a comparison means (32) for continuous determination of the difference between the matched measuring signal (CL) and a reference signal ($U_{ref}$), which is a conversion of a reference value parameter R. The invented device comprises a means (50) for selecting and assigning to the reference value parameter R a value (R(1); RH) if reserve power is to be reserved and a value (R(0); RL) if the reserve power is to be used. The change of reference values can be blocked by an unlockable blocking means.

27 Claims, 16 Drawing Sheets

METHOD DEVICE AND TERMINAL FOR MOBILE RADIO COMMUNICATION

TECHNICAL FIELD OF THE INVENTION

The present invention regards the technical field of mobile radio terminals, and more precisely a terminal for mobile radio communication and a method and a device for the purpose of reserving spare power with this type of terminal. There are further presented a method and a device for locking the use of the spare power, a method for unlocking and a terminal having those functions.

DESCRIPTION OF RELATED ART

A radio terminal may be divided into a plurality of major functional units. The power delivery unit provides the other units of the terminal with electric power. In the small, hand-held radio terminals for telecommunication, the power delivery unit is a rechargeable accumulator, colloquially called a battery. Most often, an empty battery may be switched for a fully charged one. The exchange can be made with at most a few simple manipulations. There are, however, also terminals having the possibility of charging the battery when it is mounted and while the terminal is in use.

Another important unit in the terminal is the control unit, which comprises a micro-processor with its input and output units. The control unit among other things controls and supervises communications between different units in the terminal. In addition, the control unit provides for sensing of the keypad of the terminal, control of the display unit and menu handling and menu display.

Also the control and indication of how much charge is left in the battery is done by the control unit. The control unit senses the battery voltage and compares this value with a reference value corresponding to the battery voltage for which the battery has no longer enough charge for establishing and upholding of radio contact with an adjacent radio receiver in for example a base unit or base station. When the battery voltage coincides with the reference value, a terminating routine in the control unit is initiated, closing down the terminal. Possibly, an audio signal is emitted, which warns the user of the terminal that the battery voltage is too low, and that the terminal will switch off shortly.

If a terminal has been switched off due to the battery voltage being lower than the reference value, the terminal cannot be used again until the power delivery unit can deliver sufficient electric power, either through charging of the battery or being switched for another charged one, or by connecting an external power source to the terminal. The control unit will switch off the terminal—if not immediately, at least a second or some seconds after switching on. This time delay depends on the necessary time from switching on until the control unit has read and compared the battery voltage once, initiated and gone through the termination routine.

Mobile radio terminals have evidenced themselves to be of particular usefulness in situations of distress. In many cases, it has been a question of life and death to be able to call for fast help through wireless. However, there have been cases where the terminal was unusable because the battery was dead. That the terminal is used so long time between rechargings that it is quite dead before recharging is nothing unusual. In certain cases, it would still be desirable to be able to take out a little extra power from the terminal in order to perform a necessary call or telephone conversation.

From the English abstract of the Japanese patent application with publication number JP, A, 06-006 283 there is previously known a portable telephone terminal provided with a function which is connected when the ordinary battery, provided for normal use, is emptied of its charge. The terminal comprises three batteries—beside an ordinary battery for normal use, also an emergency battery and a battery which functions as a back-up battery for the two circuits which control the use of the emergency battery. In order to determine if a telephone call is allowed to utilize the emergency battery, the telephone number made is compared to previously stocked alarm telephone numbers. Calls to non-stored numbers is blocked by the two said circuits. If the telephone number is a programmed alarm number, the emergency battery is connected. Thus, the energy is saved for only those very important calls.

The above-mentioned prior art terminal has several drawbacks. A great drawback is that this constructive solution has several batteries. Already one emergency battery means that the weight of the terminal is greatly increased, and the terminal thus becomes unnecessarily heavy and unwieldy. Many users desire the terminal to be as light as possible. Beside several batteries, there are particular circuits for control and surveillance. From the point of view of the man of the art, this solution does not admit of a simple and low-cost implementation in an existing terminal construction, already comprising many units.

SUMMARY OF THE INVENTION

The present invention prevents the problem which occurs when a user of a mobile telephone terminal wants to make an important call, for example in a distress situation, but has emptied the power delivery unit of all charge. In other words, the invention solves the problem of how the user shall be prevented from emptying the power delivery unit in normal use. Thus, it is desirable to be able to save or reserve charge in normal use.

A further problem tackled by the invention is how to enable for the user to use this reserved charge for making a call to for example an alarm center.

The invention also tackles the problem of how to construct a terminal in order not to have extra power delivery units like for example emergency batteries. Already one emergency battery will mean that the weight of the terminal increases considerably, and the terminal thus becomes unnecessarily heavy and unwieldy. Many users desire the terminal to be as light as possible.

Another problem tackled is that the solution should be easy and inexpensive to implement in a terminal with many other functions.

There may also be a problem for certain users if it is too simple to attain the reserve power and use this instead of recharging the power delivery unit.

It is thus an object of the present invention that the user should avoid a situation where he cannot use his mobile phone telephone because the power supply unit lacks charging.

Another object of the present invention is thus to prevent the user from voiding the power supply unit from all charge in normal use. There should thus be a possibility to save or reserve charge in normal use.

A third object of the present invention is that the user shall be able in a simple manner to attain the saved charge in order to make a call for example to an alarm center.

A fourth object of the present invention is to construct a terminal having no extra power supply units, like for example distress batteries.

A fifth object of the present invention is that the solution should be easy and economic to implement in a terminal with many other functions.

A further object of the present invention is that it is so adapted that it can cooperate with already implemented functions and techniques of a terminal.

Another further object of the invention is that it shall be able to block the use of the reserve power until the user has given an unlock code.

The actual invention solves the problems recited by reserving in the only, common power delivery unit, of a certain amount of electric charge corresponding to a measurable value of a reference value parameter, which charge can be utilized for further radio communication only if the reference value parameter is changed to another, lower value of the reference value parameter.

The problems recited are solved by means of an inventive device for reserving and utilizing reserve power in a terminal for mobile radio communication which beside a plurality of necessary functional units comprises a power delivery unit which for the functional units is the sole common storing unit for electric charge, a means for sensing the electric charge in the power delivery unit and for determining an adapted measuring signal corresponding to the electric charge in the power delivery unit, a comparison device for continuing determination of the difference between the adapted measuring signal and a reference signal which comprises a transformation of a reference value parameter and that the terminal comprises a means for selecting and assigning a value for the reference value parameter if reserve power is to be reserved, and another value if the reserve power is to be utilized.

Further, the actual invention solves the recited problems by means of a method for reserving and using reserve power in a terminal for mobile radio communication, which beside a plurality of necessary functional units, comprises a power delivery unit which for the said functional units is the sole common storing unit for electric charge, and which method comprises the steps to sense the electric charge in the power delivery unit and determine a value which corresponds to the electrical charge in the power delivery unit, that the value is continuously compared to a reference value parameter, that a value is chosen for the reference value parameter in dependence of whether reserve power is to be reserved or utilized, and that the reference value parameter is given a value if reserve power is to be reserved and another value if the reserve power is to be utilized.

The invention is applied in a terminal for mobile radio communication in order to solve the recited problems. The new terminal comprises an antenna unit, a radio part, a control unit, a unit for storing control programs, a unit for storing data, a keypad unit, a display unit, a power delivery unit which is the sole common storing unit for electric charge, a means for sensing the electric charge in the power delivery unit and for determining an adapted measuring signal corresponding to the electric charge in the power delivery unit, a comparison unit for continuous determination of the difference between the adapted measuring signal and a reference signal which comprises a transformation of a reference value parameter, and that the terminal comprises a means for selecting and assigning a value to the reference value parameter if reserve power is to be reserved and another value if the reserve power is to be utilized.

Moreover, there are presented a method and a means for blocking the use of the reserve power, an unlocking method and a terminal having those functions.

An advantage is that a user can, according to own preferences, activate and inactivate a device for reserving and utilizing reserve power.

One advantage with the present invention is that the user knows that there is reserve power available in the power delivery unit.

It is of advantage that the user can easily attain the saved charge for calling e.g. an alarm center.

A further advantage with the invention is that it enables a terminal construction without extra power delivery units, e.g. emergency batteries.

The invention is easy and economic to implement in a terminal having many other functions.

It is also of advantage that the invention is so adapted that it can utilize and cooperate with already implemented functions and techniques.

Another advantage with the invention is that it is possible to block the reserve power and prevent its use until the user wishes to utilize it, in which case the user can unlock the blocking.

The invention will now be described further by means of preferred embodiments and with reference to the appended drawing.

PREFERRED EMBODIMENTS

Figure 1:
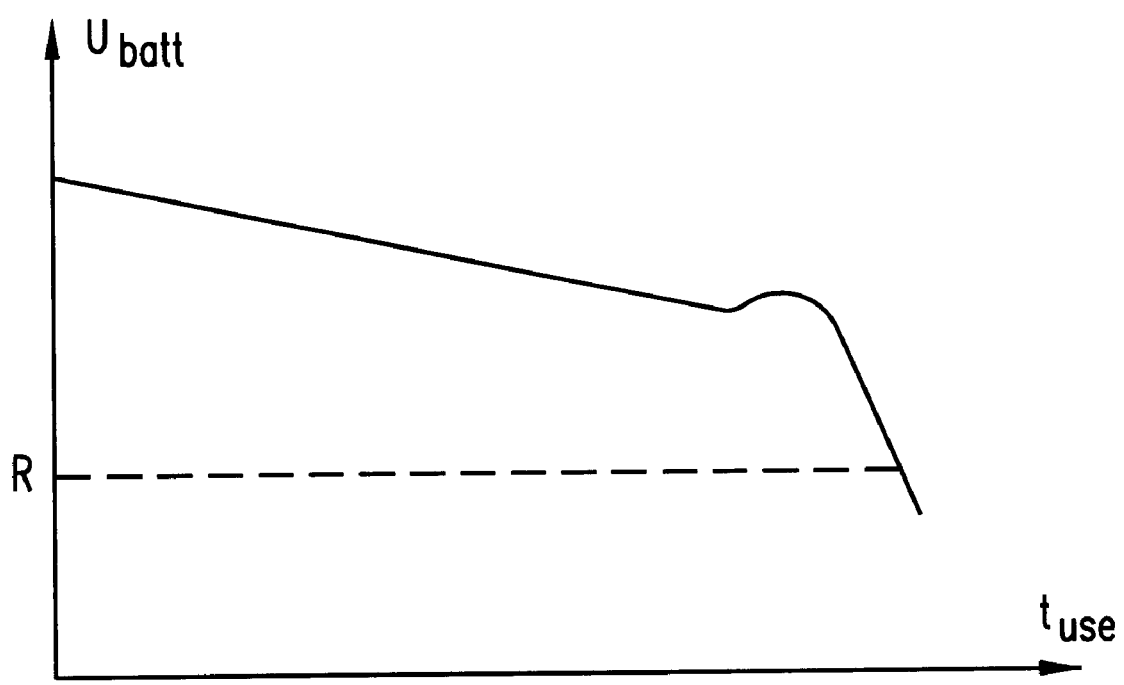
FIG. 1 is a curve graph illustrating the battery voltage $U_{batt}$ as a function of time $t_{use}$.

FIG. 1 is a graph showing how the battery voltage $U_{batt}$ which is a measure of the charging of the battery, varies with time $t_{use}$. The power consumption varies and is heavily dependent on a number of different factors. A fully charged battery is sufficient for a long time before it is dead, if the terminal is only held in a waiting state, so-called "standby mode". If the terminal is much used for transmitting and receiving, the battery will naturally go dead much faster. If further the conditions of signal reception is poor at the place where transmitting and reception is performed, the power consumption increases heavily, compared with normal circumstances. Therefore, the time scale and the length of the curve will vary much depending on he main terminal use.

The form of the curve is also dependent on the type of battery used. Many battery types have a plane and slowly decreasing characteristic battery curve. As the charge after some use time begins to finish, the battery voltage falls rapidly, and the curve will steeply fall. In many battery types, there is a small increase of the battery voltage at change-over from the flat portion and the steep fall of the curve.

The battery type thus determines the characteristic curve, and the knowledge of this characteristic curve is used in order to determine how much charge remains before the battery is dead. By measuring the battery voltage it is thus possible, with the help of the characteristic curve, to determine and display the actual battery capacity by means of an indicator in a terminal display.

At a certain measured battery voltage, there remains so little capacity in the battery that it is not possible to transmit or receive radio signals. Each terminal has at least one micro-processor for the control of the different functions of the terminal. The micro-processor may be programmed to terminate operation in response to an electric signal indicating a dead battery. The battery voltage is sensed or measured by a measuring device, and a resulting voltage or signal, analogue or digital, is connected to one of the inputs of the microprocessor. The control program of the microprocessor then starts a terminating routine, which guarantees that the terminal can restart when the battery has again sufficient capacity, after which the terminating routine terminates the terminal. In the curve diagram of FIG. 12, the termination voltage for the battery is shown as a reference value R.

Figure 2:
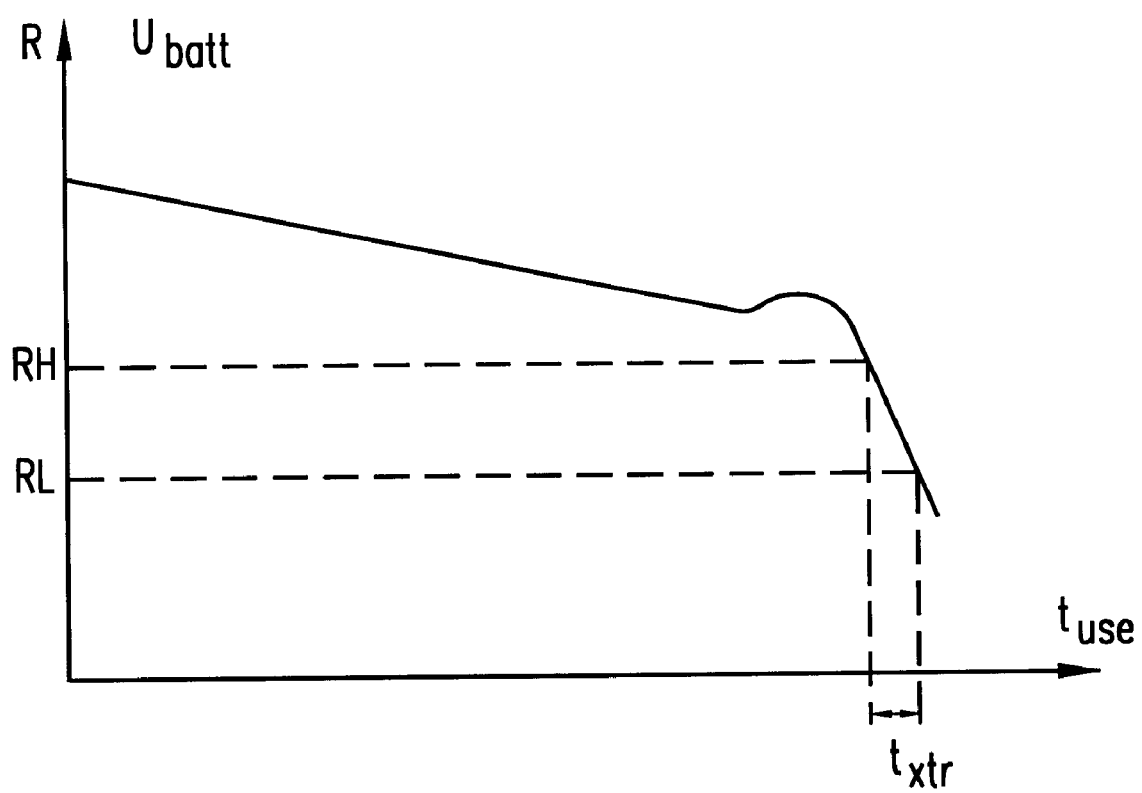
FIG. 2 shows the same curve graph as FIG. 1 but with a further reference value RH added.

FIG. 2 shows the same battery voltage curve $U_{batt}$ as in FIG. 1, but with two reference values RL and RH drawn in. Those two reference values define a time interval $t_{xtr}$. The reference value RL corresponds to the battery voltage at which the terminal is automatically switched off. The reference value RH is a voltage which corresponds to a certain remaining power capacity of the battery before it is dead. This power capacity is enough for further radio communication during a time period which has the length of $t_{xtr}$ time units, before the battery is dead and the terminal will switch off automatically. The length of the time period $t_{xtr}$ can thus be selected by selecting a correspondingly higher reference value RH.

Figure 3:
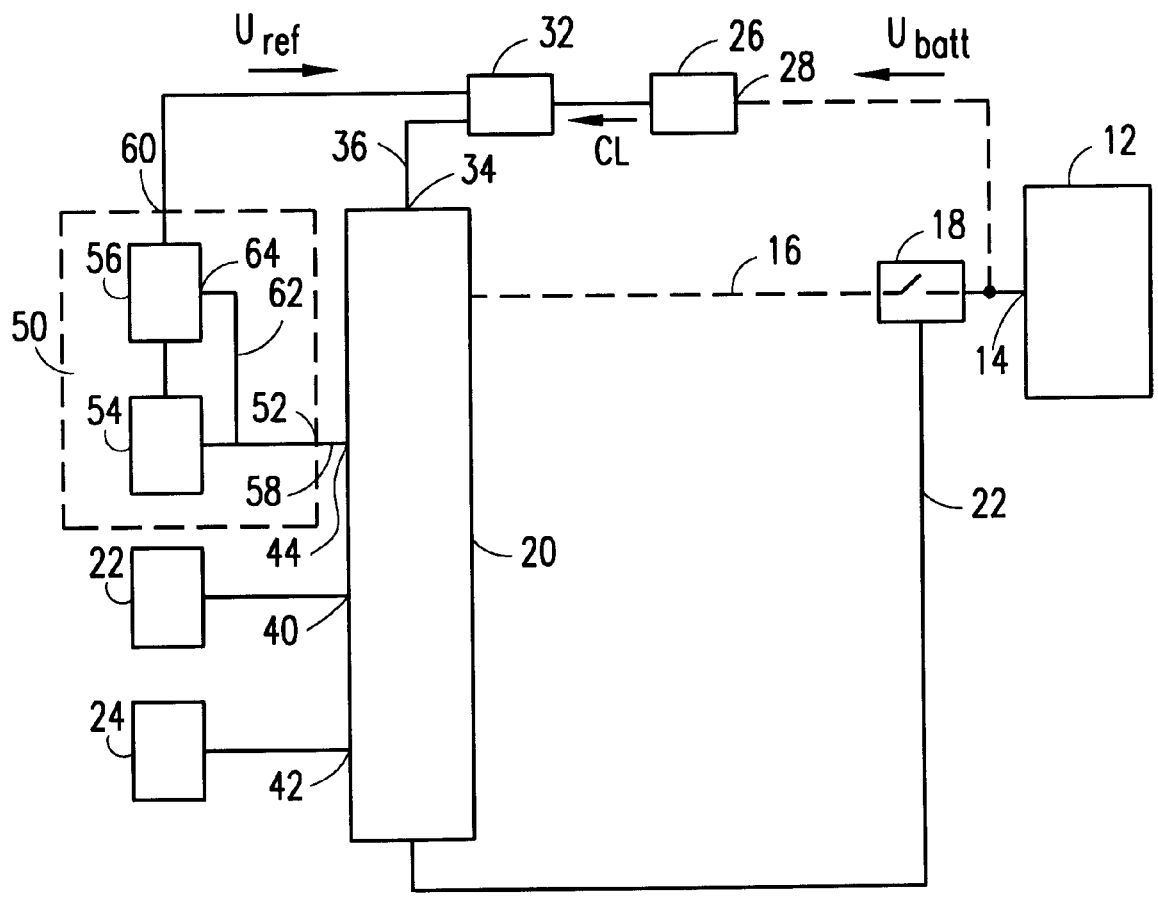
FIG. 3 shows a block diagram of the inventive device.

FIG. 3 shows a block diagram of a means for surveying the power supply from a power supply unit 12 which is arranged in a apparatus, e.g. a portable terminal for radio communication. The power supply unit 12 is the only common storing unit for electric charge for the units and means of the apparatus. To the output poles of the power supply unit is connected a power supply connector 16, which is so arranged that all the means or units of the apparatus can have its power provision satisfied. As shown in the figure, a means 18 is arranged to disconnect the power supply on the lead 16 immediately adjacent, before the lead is divided into different leads to respective means or units. In FIG. 3, the lead is only connected to a control means 20, but the other means or units connected to the control means get their power supply from the lead 16 directly or indirectly via the control means. The means 18 for breaking the power supply, which functions as a controllable breaker, is controlled by the control means which sends control signals to the means 18 via the lead 22. If the control means is arranged in an apparatus or device having different means, units and functions, the control means can also be arranged to control and watch those other means, units and functions. The control means 20 includes a microprocessor, which is controlled by software programs which are stored in a means 22 for storing control programs, which means is in the following called the program storing means. The means 22 includes at least a ROM memory (Read Only Memory) and is connected to a port 40 of the control means 20. All the tasks that the control means 20 performs are ordered by the programs.

The control means 20 is also connected to a means 24 for storing data. This means is in the following called the data storing means. The data storing means 24 is connected to a port of the control means 20. The data storing means 24 includes at least a RAM memory (Read Access Memory). In the means 24 for storing data are stored necessary data for the function of the control means (different numerical data, constants, momentary values of a parameter, reference values, etc.).

The storing means 22 and 23 are divided into addressable memory cells and every memory cell contains either a programming instruction or a number, e.g. a parameter value. Unlike the cells of the ROM memory, the contents of which is permanent, the contents of the RAM memory and its cells may be varied. There are also other types of memories (PROM, EEPROM, etc.) in the market which can be used in this connection.

The control means 20 in FIG. 3 watches the power supply to other means and units. For this reason, a sensing means 26 is connected for sensing the voltage $U_{batt}$ between the poles 14 of the power supply unit via a connection that is connected to an input 28. The sensed voltage $U_{batt}$ is transformed in the means 26 into a matched measuring signal CL. The sensing means 26 therefore includes an amplifier which matches (amplifies or attenuates) the measured voltage $U_{batt}$. The measuring signal CL which is obtained at the output of the means 26 may be quantitatively described by the mathematical formula $CL = A \cdot U_{batt} + U_{off}$. A is the amplifying factor of the amplifier. The offset voltage of the amplifier, $U_{off}$, is comparatively small but must still be accounted for and compensated for in a following signal treatment.

The measuring signal CL is connected to one out of two inputs 28 and 30 respectively, of a comparison means 32, in order to form a difference signal $U_{dif}$. On the other input 30 is connected a reference signal $U_{ref}$. The comparison means 32 sends a digital difference signal $U_{dif}$ to an input 34 of the control means 20.

If the measuring signal CL is analogue, this signal must be analogue/digital transformed as the reference signal $U_{ref}$ is digital. The comparison means can therefore be realized by means of a so-called analogue/digital circuit followed by a subtraction circuit for digital numbers. The subtraction circuit performs the equation $U_{dif} = CL - U_{ref}$.

According to the inventive concept, the reference value signal $U_{ref}$ will have different values. The digital signal $U_{ref}$ is generated in a means 50 for selecting and assigning different reference values to the reference value parameter. The means 50 for selecting different reference values is in the following called the reference value selector. In this embodiment, the control means 20 communicates with the reference value selector 50 via a control channel 52. The control channel is connected between a control output 44 of the control means 20 and a control input 58 of the reference value selector 50. The selector 50 also includes a means 54 for storing different reference values. This means stores reference values in such a way that each single reference value can be addressed or pointed out with a control signal unique for each reference value, in the control channel 52.

This embodiment of the invention also includes a means 56 for transmitting the reference value from the means 54 to the means 32 in order to form the difference signal $U_{dif}$. The means 56 is called the output means and functions as an output unit, which transmits, and also holds the reference value at an output 60 of the means 50. The output means 56 is connected between the means 54 and the output 60. The output means 56 is realizable by a shift register, parallel or serial dependent on the construction of the comparing means 32.

In the embodiment of FIG. 3, a control channel 62 connects a reset input at the output means 56 to the control channel 52. When a control signal at the control channel 52 initiates a change of reference value, the output means 56 is simultaneously zeroed by means of a control signal also being connected to the reset input 64, before the new actual reference value is moved from the means 54 to the output means 56. Such a construction increases the security and the reliability.

The output signal $U_{ref}$ thus contains the reference value R, which is transmitted to the comparing means 32. In simplification, $U_{ref}$ may be written as $U_{ref}$ R, where R is the reference value parameter.

The control means 20 generates a control signal in the control channel 52. The control means 20 gets the control signal from the data storing means 24. The reference value selector 50 generates a reference value signal dependent on said control signal. The control signal is an instruction to the means 50 of, which reference value R is to be selected.

In general, there are needed as many control signals as the number of reference values. The control signals in this embodiment are digital, and their different values are in binary code. In its simplest embodiment, the control signals have either the value 1 of 0 (zero) (cf. high or low). The control signals can be different binary numbers with a suitable number of bits in order to define all the different reference values which are utilized. A control signal may contain the address of one of the memory cells in which the reference values are stored if the means 50 includes a memory module with the different reference values.

In an embodiment of the invention, two different reference values, R=RH and R=RL, are generated. Two different control signals which represent two different values are needed to generate the two different reference values. One of the control signals therefore has high voltage amplitude in order to generate R=RH and low to generate R=RL.

Figure 4:
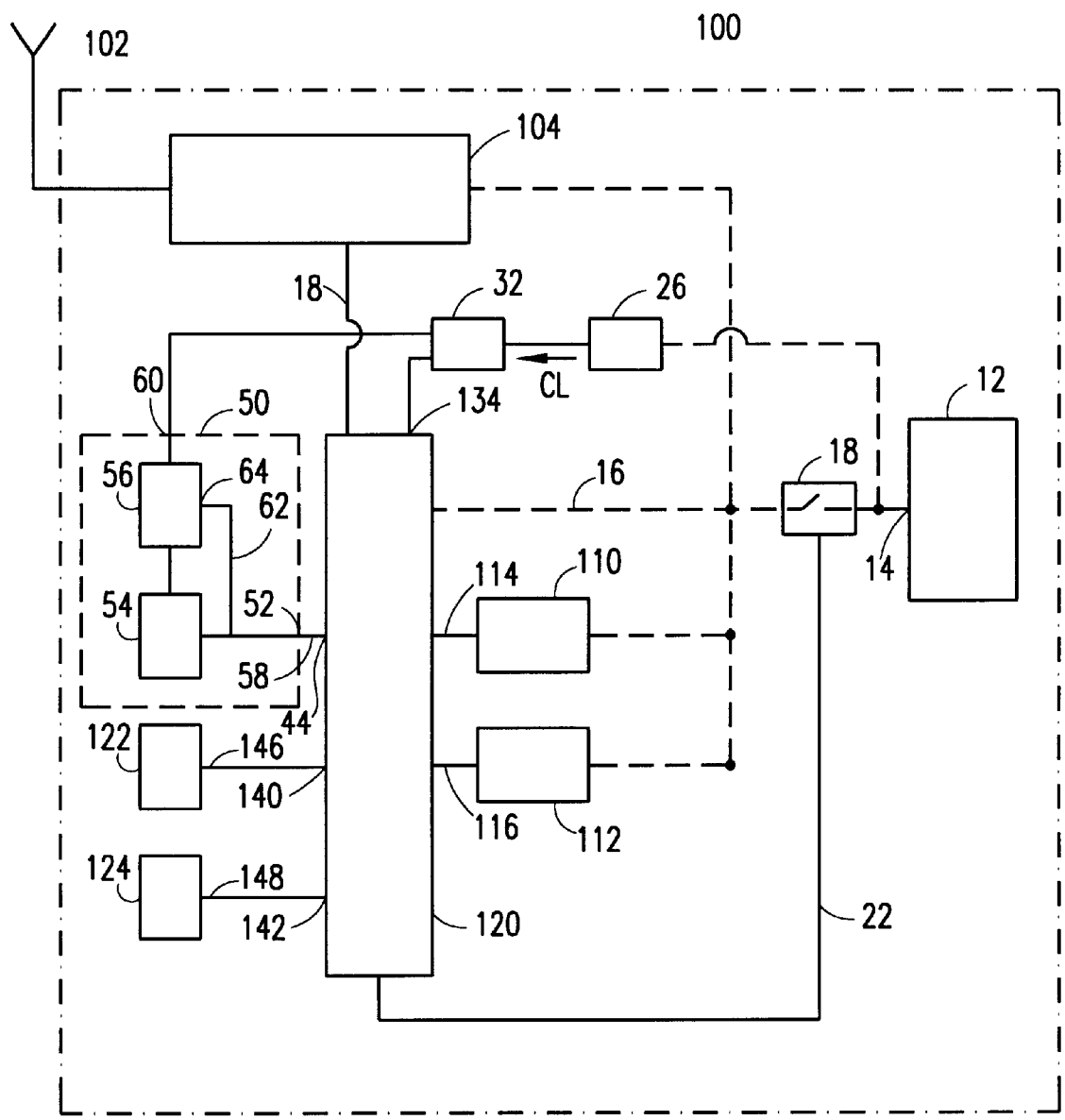
FIG. 4 shows a block diagram of a terminal for mobile radio communication, which terminal includes the inventive device.

FIG. 4 shows a simplified block diagram of a preferred embodiment of a terminal 100 for mobile radio communication, which comprises a number of necessary functional units, such as an antenna unit 102, a radio part 104, a control unit 120, a unit 122 for storing of control programs and a unit 124 for storing of data, a keypad unit 110, a display unit 112, a sensing means 26, a comparing means 32, a power delivery unit 12 and a connecting means 18.

The antenna unit 102 is connected to a radio part 104, which i.a. comprises a transmitter and receiver unit. A control unit 120 controls and checks the radio part 104 with its different units via a data bus 18.

The control unit 120 comprises at least one microprocessor, which controls and supervises the different units in the terminal. The microprocessor is controlled by a software, i.e. programs which are stored in a unit 122 for storing of control programs, which unit is also called the program storing unit. All the tasks which are made by the control unit 120 are ordered by those programs. The unit 122 comprises at least a ROM-memory (Read Only Memory). The program storing unit 122 is connected via the bus 146 to one of the data ports of the control unit, port 140. The bus 146 includes a control lead and an address bus and a data bus.

The control unit 120 also needs a unit 124 for storing of data, which unit is also called the data storing unit. This unit 124 includes at least one RAM-memory (Read Access Memory). In the data storing unit 124 are stored and fetched necessary data for the function of the control means (different numerical data, constants, temporary values of a parameter, reference values etc.). The data storing unit 122 is connected via the bus 148 to one of the data ports of the control unit, port 142. The bus 148 includes a control line and an address bus and a data bus.

The program storing unit 122 and the data storing unit 124 are generally sometimes called the storing units.

The storing units consist of memory cells and each memory cell contains either a program instruction or a binary number, e.g. a parameter value. In contrast to the ROM-memory cells, the contents of which is permanent, the contents of the RAM-memory and its cells can be changed. There are also other types of memories (PROM, EEPROM, etc.) in the market, which may be used in this connection.

Examples of functions which are controlled by the control unit are sensing of the keypad of the terminal, regular control of the display unit of the terminal and handling and showing of menus in the menu system. All the functions which are made by the micro-processor of the control unit are ordered by the control programs. Further microprocessors may be used in order to perform certain of the functions of the terminal. Those microprocessors are subordinated to a main microprocessor. Each microprocessor with attached software is a control means. However, it is possible to implement different control means as different softwares in one single microprocessor, defined as a control unit. In this case, the control unit consists of different control means implemented as software.

The control means 120 is connected to a number of input and output units and matching units, which are not shown in the Figure.

A keypad unit 110 is connected via a data bus 114 to the control unit 120. For showing of menus, telephone number, values, indications and different information which is either stored in the data storing unit 124, or data information which is typed in from the keypad 112 by the user, a display unit 112 is required. The control unit 120 communicates with the display unit 112 via a data bus 116.

The control unit 120 comprises a particular control means for performing the tasks of driving and controlling the display unit, and a control means for the menu system. Terminals including a menu system are menu-controlled. Each control means includes a microprocessor with associated memory-, input/output- and adjusting means. If in the terminal another microprocessor is used than the microprocessor of the control unit, the main processor, for the control of the menu system and its handling, this other microprocessor also takes care of the communication with the control unit of the terminal. The menu system is presented more in detail in connection with FIG. 5.

The above mentioned units receive their power supply from a power supply unit 12, which is the only common storing unit for electrical charge for all of the units comprised in the terminal 100. Those units are connected via a power lead system 16, either directly to the poles 14 of the power supply unit 12 or via a contact unit 18, which in turn is connected to the power supply unit 12. The contact unit 18 may be put in a state of on or a state of off. This contact unit is controlled by the control unit 120 via the lead 22.

The control unit 120 supervises the power supply from the power supply unit 12. The sensing means 26 for sensing and determining a value CL corresponding to the electrical charge of the power supply unit 12 is connected to the poles 14. A comparison unit 32, which is connected to the sensing device 26, compares continuously the value CL with a reference value parameter R.

What is new with the terminal 100 is that it includes a reference value selector 50 for generating different value signals in the power supply unit 12, which is the only common storing unit for electrical charge. The means 50 consists of a means 54 for storing different reference values and an output means 56 for transmitting the reference value to the comparison means 32. The means 50 puts the reference value parameter R to a value RH if reserve power is to be reserved and to a value RL if reserve power is to be used.

The user of the terminal can, according to his own wish, activate and inactivate the possibility to store reserve power. When it is activated, there is reserved in the power supply unit 12 a certain amount of electrical charge, corresponding to a measurable value RH on the reference value parameter R, which charge may be used for further radio communication only if the value of the reference value parameter R is changed to another and lower value RL. If the user selects not to use the possibility to stop reserve power, only the lowest reference value RL is used in the comparison means 32 in order to make the signal $U_{dif}$ from the activation of the terminal.

Since the reference value selector 50 is realized by a means 54 for storing of different reference values, it is possible to complete the terminal with a function, with the help of which a user may change the value of the stored reference values. Said function may be activated from a menu in the menu system. When the menu is activated, the user may change the values of RH and, if so desired, RL. The user designates the value he wants to change in order to get more or less reserve power stored. It is thus possible to diminish the reserve power to zero by setting RH=RL. It is practical for a user to have the reserve power presented as the magnitude of saved calling time. The data storing unit 124 contains a transformation table, which transforms time to a value of RH or RL. The control unit 120 fetches the wish of the user from the keypad unit 110 to the transformation table in the data storing unit 124. The new value of RH or RL which is generated by the transformation table is moved by the control unit 120 from the data storing unit 124 to the address in the means 54 for storage of the reference values which RH or RL has. The reference value selector 50 thereafter functions with the new reference values. It should be pointed out that the values in the transformation table are dependent on the battery characteristic which the battery used has.

Intelligent batteries, which have a memory capacity, may store the values of the transformation table and transmit those to the data storing unit at an appropriate moment, e.g. battery exchange.

The terminal is provided with functional keys and a menu system with the help of which a user may activate and inactivate the reserve power storage.

Figure 5:
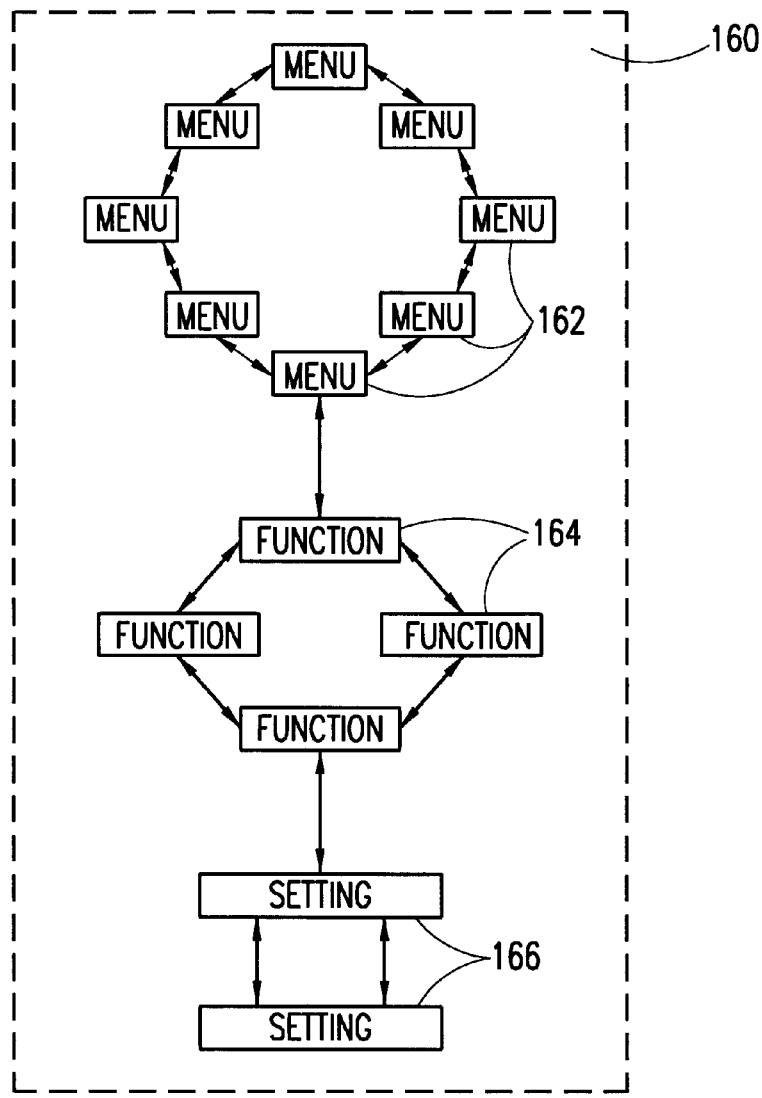
FIG. 5 illustrates a menu system included in the terminal.

In FIG. 5 is shown a schematic sketch of a menu system 160. The system is subordinated to the control unit 120, but is sometimes seen as a means or a unit comprised in the display unit of the terminal, which controls and supervises the showing in the display window. The menu system consists of both a control program and data and hardware in the form of a microprocessor with associated memories and matching circuits. The menus are shown in the showing window of the terminal, the so-called display. The display unit 112 includes the display. Every menu 162 contains one or more selectable functions 164. A function 164 can have one or more settings 166. Examples of such functions are the different possibilities for relaying incoming calls. Each possibility corresponds to a function, which can be activated or cancelled by changing the function setting (active/inactive; on/off). The user may, for instance, relay all calls or only calls which he does not answer or when occupied. Those menus are collected one and the same menu (relaying). When leaving the menu system, either automatically (after a certain time) or because the user manually leaves the menu system, the terminal sets a starting position. In this position, a standard window is shown in the display of the terminal, with indicators and basic information.

Figure 6:
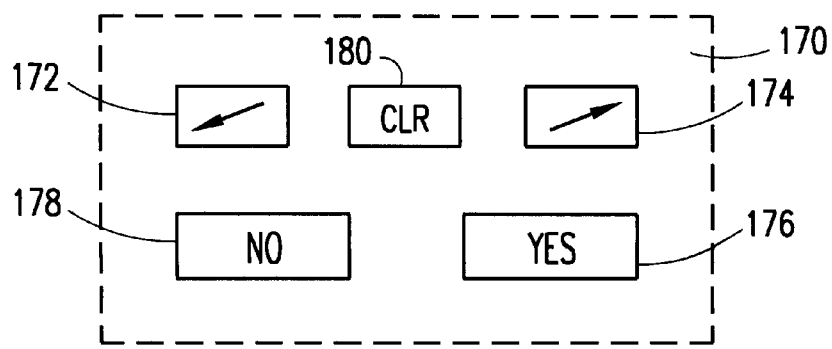
FIG. 6 shows the function keys of the terminal.

In FIG. 6 are shown the function keys 170 (function buttons) which are used to handle the menu system 160. The keys left arrow 172 and right arrow 174 are used to go from menu 162 to menu 162, change between different functions 164 in a menu or switch between different settings 166 in a function 164. With the answer key "YES" 176, the user may select a menu 162, function 164 or setting 166. With the "NO" key 178 the user may switch from setting 166 to function 164, from function 164 to menu 162 and from menu 162 to the start position, where different indicators are shown. Those indicators may, for instance, show actual signal force, battery voltage, telephone network, etc. The clearing key "CLR" is used in order to exit the menu system to the starting position. Those functional keys 170 are included in the keypad unit 110 of the terminal.

The function to reserve reserve power is arranged in the menu system 160 of the terminal. By means of the functional keys 170 of the terminal a user steps forwards to a menu for activating or inactivating the possibility to reserve and thus ensure reserve power. This menu is subsequently called the reserve power storage activation menu. The activation menu is shown in the display of the terminal and has a headline "Reserve Power Storage" and a setting line which informs whether the reserve power storage is "active" or "inactive". The user may switch between the two settings by means of the arrow keys 172, 174, and select setting by means of the answer key "YES" 176. Beside the activation menu of the function there is also a menu with the text "Use the reserve power ?". This menu, called the use menu, will automatically be written in the same way as other menus in the menu system on the display of the terminal. The reason for said menu being shown is that the battery charge has sunk down to slightly below the upper reference value (R=RH). The user may answer "YES" or "NO" in the setting line by means of said answering keys 176, 178. If the user answers "YES", the reference value is changed to the lower reference value, and the user can then use the difference between those two reference values for radio communication for some further time. If the user answers "NO", the terminal is automatically switched off.

The fact that the reserve power function is fit into the menu system has menu advantages, which directly and also indirectly will be apparent from the further presentation of different embodiments of the invention.

In the following section a first preferred embodiment of the invention will be presented.

As stated above, a user may activate the storage of reserve power in the common power delivery unit 12 by means of the functional keys 170 and the menu system 160. In this embodiment of the invention, an activation parameter A is used, which has different values in dependence of whether reserve power is to be stored or used. This parameter is thus controlled from said explained activation menu. If the user answers "ACTIVE" in the setting line of the activation menu, the control unit 120 will give the activation parameter A for example the value 1 ("one"). If the user answers "inactive" in the setting line of the activation menu, the control unit 120 will set the activation parameter A to for example the value 0 ("zero"). The activation parameter A is stored at an address in the data storing unit 124.

Since in this method the reference value parameter R is dependent on the value of the activation parameter A, the reference value parameter R is from now designated R(A) in the presentation of the first preferred method. In FIG. 2 is shown a diagram with a battery voltage curve. In the diagram two reference values RH and RL are drawn. With the above designations of the reference value parameter R(A), R(1)=RH and R(0)=RL.

Figure 7A:
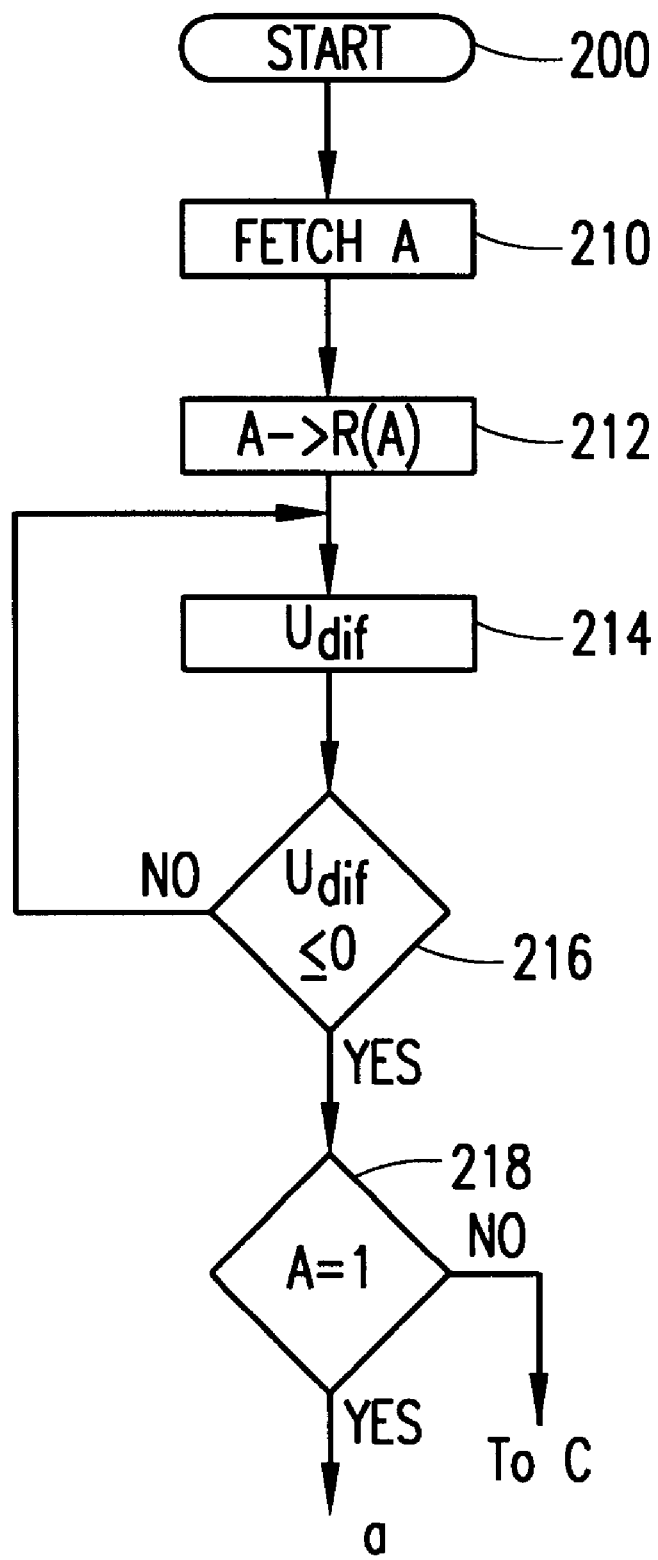
FIGS. 7a, 7b and 7c show a flow chart of a first method according to the invention.
Figure 7B:
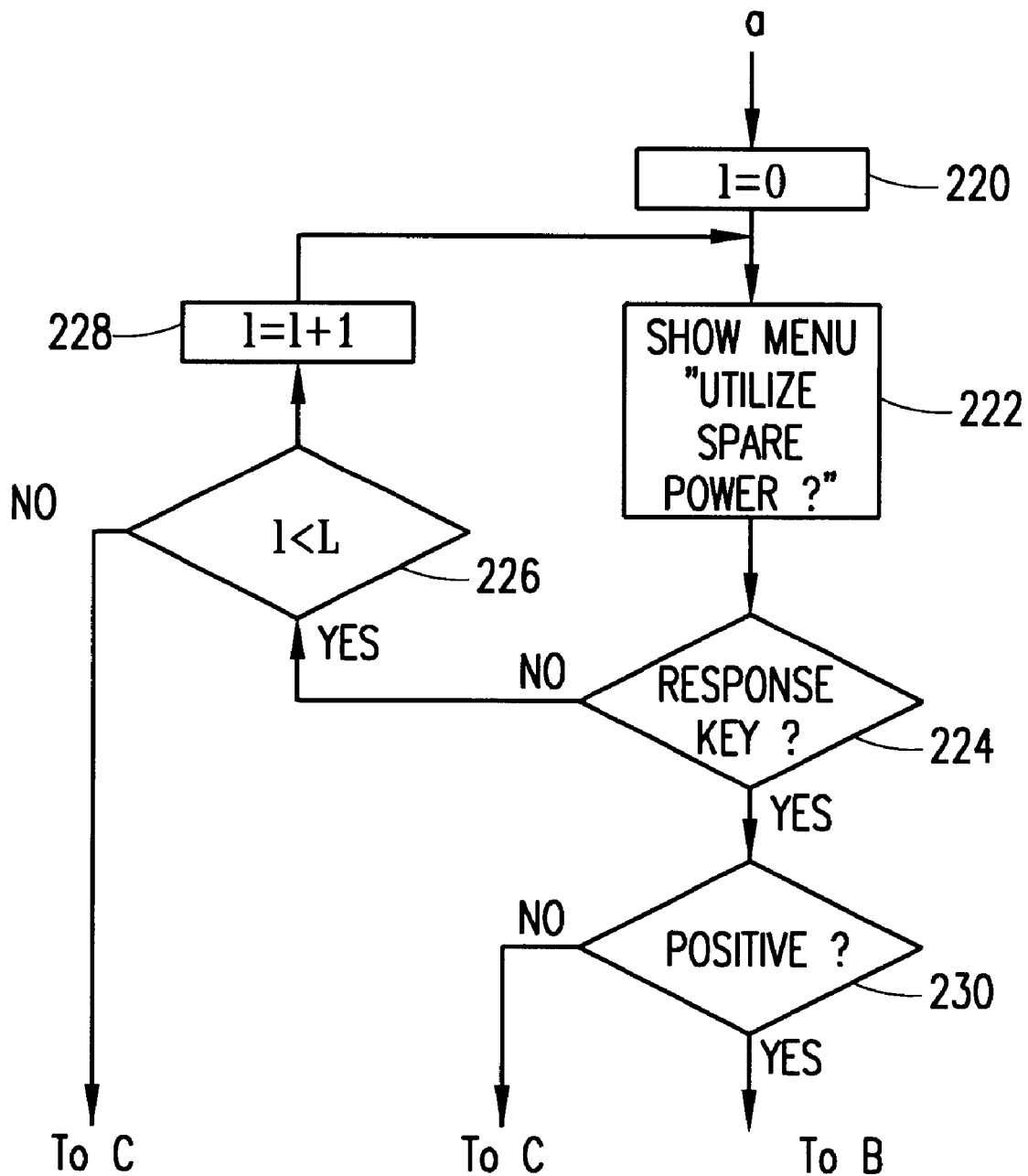
Figure 7C:
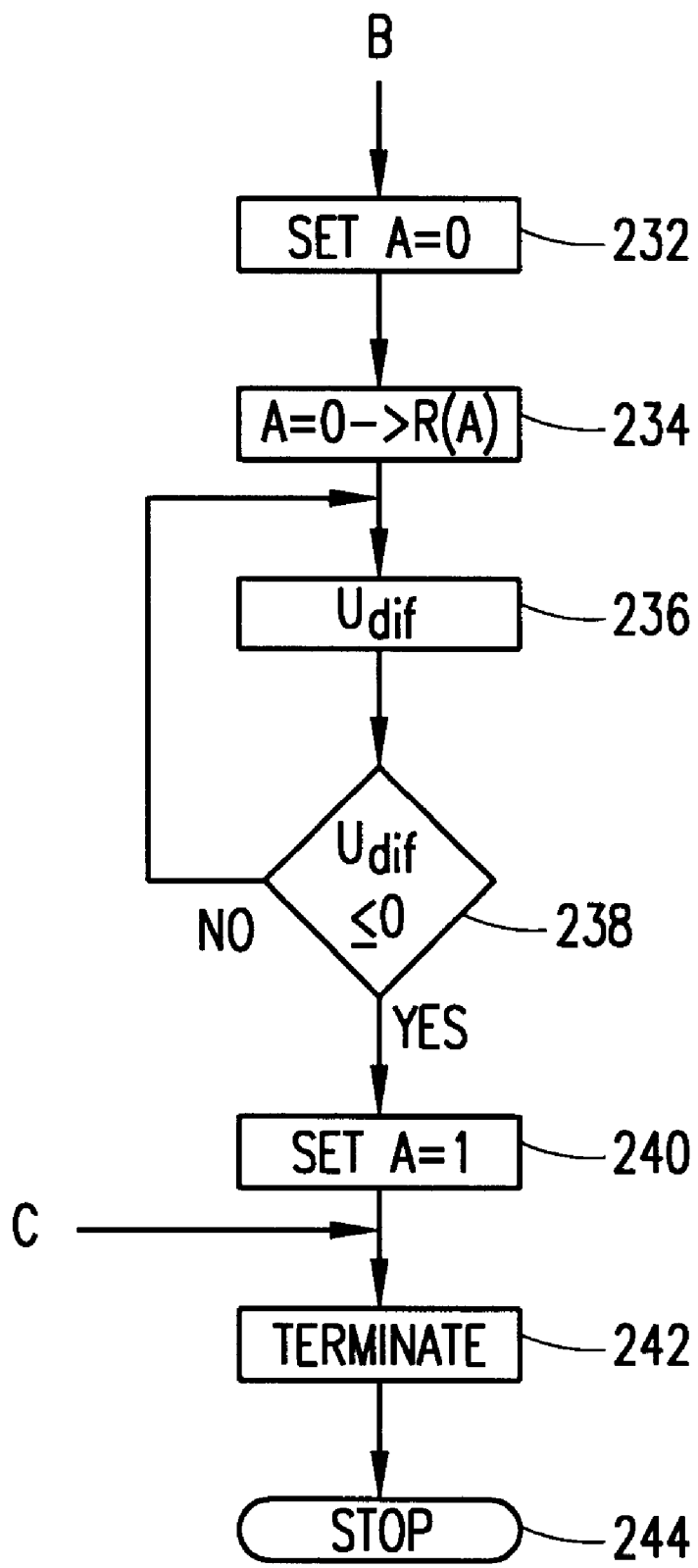

In FIGS. 7a–7c is shown a flow diagram of the first preferred method. In step 200, the terminal is activated, and the value of the activation parameter A is fetched in step 210 from the address in the data storing unit 124. In the next step 212, the value of the activation parameter is transmitted as an instruction (control signal) from the data storing unit 124 via the control unit 120 to the means 50 in order to select reference value (also called the reference value selector), in which the reference value parameter R(A) is assigned the value which belongs to this value of A. Step 212 includes also that the actual reference value is transmitted to the comparing means 32 and is used in the difference-making CL–R(A). This difference creates the signal $U_{dif}$=(CL–R(A)), which in step 214 is fetched and temporarily stored in a place (address) of a data storing unit. In step 216, the value $U_{dif}$ is compared to the value zero until the condition that the difference is less than zero is fulfilled. An iteration of the steps 214 and 216 proceeds as long as the condition "$U_{dif}$" is fulfilled (NO). When the condition is fulfilled (YES), the next step is performed.

In step 218 it is tested whether the reserve power storage is activated by controlling the value of the parameter A. The parameter has different values dependent on whether the reserve power storage is activated or inactivated. If the parameter has the value which means that the storage is inactivated (in the embodiment example and in the Figure set to A=0), the sequence is automatically stepped to point C and step 242 in the flow diagram. Step 242 means that the programmed termination routine is started, whereby the terminal is logged off when the routine is ready, step 244.

If the reserve power storage is activated, the parameter has a corresponding value (in the Figure and in the embodiment the parameter is set to A=1), and thus the condition (A=1) is fulfilled (YES). If the condition is fulfilled, the process proceeds with step 220. In this step, an iteration variable 1 is set to zero (1=0). In step 222, a user menu "USE RESERVE POWER ?" is initiated and shown. The user of the terminal is then in step 224 expected to give an answer "YES" or "NO" by pressing one of the two answer keys "YES" or "NO" (176 or 178 in the Figure) within a certain time period. The menu is shown on the display unit of the terminal during this preselected time period, which corresponds to the number L of iterations. For each iteration, 1 is added to the variable 1 in step 228 while the menu is shown. Before adding 1 to 1, there is tested whether the condition "1<L" is fulfilled in step 226. The iteration of the steps 224, 226 and 228 goes on until the condition is false (NO), whereby the sequence is automatically stepped to step 242 (via the point C in the flow diagram). The condition becomes false if none of the answer keys is pressed during the time period. In step 242 the termination routine is initiated, and when this has been gone through (step 244), the terminal is terminated.

If, on the other hand, one of the answer keys, 176 or 178, is pressed down, the condition in step 224 is true (YES), and the iteration is therefore stopped and the condition "positive" in next step 230 is tested. If the answer key "NO" 178 is pressed down (the condition positive is thus not fulfilled), the user does not want to use the stored reserve power, and the sequence automatically goes to the termination step 242 (via the point C in the flow diagram). If the answer key "YES" 176 is pressed down and the condition is thus fulfilled, the step 232 follows (via the point B in the flow diagram), in which the activation parameter A is temporarily set to 0 (zero). In the next step 234, the reference value is set to R(0) by transmit-ting the value A=0 of the activation parameter as an instruction (control signal) from the data storing unit 124 via the control unit 120 to the means 50 in order to select the reference value (also called the reference value selector). Step 234 also includes that the actual reference value R(0) is transmitted to the comparing means 32 and used in the difference-making CL–R(0). This difference creates the signal $U_{dif}$, which in step 236 is fetched and stored temporarily in the intended place in a data storing unit to be compared in step 238 with the value zero. The iteration of the steps 236 and 238 goes on as long as the condition "$U_{dif} \leq 0$" is not fulfilled (NO). The iteration stops when the condition is fulfilled (YES) and goes on to step 240, in which the parameter A obtains its original value A=1 (the reserve power storage is activated). Then, the termination routine is started in step 242, which logs off the terminal when the routine has been gone through, step 244, The following part of the description has the object to explain the function of the terminal including the first embodiment of the invention. The text and the reference figures make reference to FIGS. 2, 3, 4 and 7a–7c.

With this first embodiment of the invention, the user of the terminal can, according to desire, activate and inactivate the reserve power storage. An activation parameter A has different values depending on whether the reserve power storage is activated or inactivated. The value of this parameter can be set by means of a menu system of the type earlier described (see FIG. 5). Such a menu system includes a menu, which is connected to the reserve power storage. This menu is brought forward and shown in the display 112 of the terminal (the display window). A terminal user can then read the text "RESERVE POWER STORAGE" and one of the settings "active" or "inactive". The user may shift between the two settings by means of the arrow keys and select the setting by means of the answer key "YES".

Alternatively, the function for the reserve power storage can be set under another menu. Nevertheless, the fetching and selection of menu, function and setting are made as earlier described.

When the reserve power storage is activated, the control unit 120 puts an activation parameter A in a certain memory cell in the data storing unit 124 to a certain pre-determined value. If the reserve power storage is, on the other hand, inactivated, the control unit sets the same parameter to another predetermined value. In the embodiments presented in this application, the parameter A has the value 1 (one) when the storing is activated and 0 (zero) when the storing is inactivated.

The value of the parameter A is connected to the value of a reference value parameter R. When the storing is activated, there is reserved in the power delivery unit a certain amount of electrical charge, which is measurable and corresponds to a first reference value R(1)=RH, which charge can be used for further radio communication during a certain time ($t_{xtr}$) only if the value of the reference value parameter R is changed to another lower reference value R(0)=RL. The change is made by the user indirectly changing the parameter value A from 1 (one) to 0 (zero) by pressing the "YES" answer key when the menu "USE THE RESERVE POWER ?" is shown.

When the terminal is activated, the control unit 120 fetches in step 210 the value of the parameter A from an address in the data storing unit 124. In next step 212, the control unit 120 sees to it that the activation parameter value is transmitted as an instruction (control signal) from the data storing unit 124 via the control unit 120 to the means 50, in order to select the reference value (also called the Reference Value Selector), in which the reference value parameter R(A) is given the value which belongs to this value for A. Step 212 also includes that the reference value selector 50 transmits the actual reference value R(A) to the comparing means 32. The reference value R(A) can be fetched from a memory address or a table in which the parameter values and corresponding reference values are stored. The comparing means 32 includes an A/D transducer which transforms an analogue measuring signal CL, which is a measure of the charge and voltage of the battery, into a digital signal CL, the binary value of which corresponding to the measuring value of the analogue signal. If the signal source is a battery, the signal is an AC voltage and the measuring value the amplitude of the signal. When the measuring value has been transformed into a digital signal CL, a difference signal $U_{dif}$ by subtracting the reference value R(A) from CL. The information which is stored in the signal $U_{dif}$=(CL−R(A)) is used both for the battery charge indication of the terminal and for the reserve power function.

The control unit 120 fetches the signal $U_{dif}$ iteratively from the input 34 and stores it temporarily in the memory address provided. The iteration is made with the clock frequency or some partial multiple of the clock frequency. In step 216, $U_{dif}$ is compared in the control unit with the value zero iteratively until the condition that the difference is smaller than zero is fulfilled. The iteration goes on as long as the condition "$U_{dif}$" is not fulfilled (NO). When the condition is fulfilled (YES), the next step is performed.

In step 218, the control unit 120 tests if the function for reserve power storage is activated by controlling the value of the parameter A in the data storing unit 124. If the activation parameter A has the value meaning that the function is inactivated (in the embodiment and figure selected at A=0), the sequence is stepped automatically to the point C and step 242 in the flow diagram. Step 242 means that the control unit 120 starts the programmed termination routine, whereby the terminal is logged off when the routine is completed (step 244). That the storing function is inactivated means that no reserve power is reserved. If the function is inactivated, the whole battery capacity is used from beginning to end, and the method will only use the steps 200–218 and 242–244 according to the flow diagram.

If the function for reserve power storage is activated, the parameter A has a corresponding value (in the figure and the embodiment the parameter is chosen at A=1) and thus the condition (A=1) is fulfilled. If the condition is fulfilled, the process proceeds with step 220 (via point A in the flow diagram). In this step, the control unit sets an iteration variable l at zero (l=0). In step 222, the control unit 120 initiates a showing of a user menu "USE RESERVE POWER ?" on the terminal display. The menu belongs to the menu system 160. The user of the terminal is then expected to give an answer "YES" or "NO" by pressing one of the two answer keys "YES" (176) or "NO" (178) within a certain time period. The menu is shown on the display unit of the terminal during this preselected time period, corresponding a number of L iterations. For each iteration there is added 1 to the variable l in step 228 while the menu is shown. Before the addition of 1 to l there is tested whether the condition "l<L" is fulfilled. The iteration proceeds until the condition is false (NO), whereby the sequence is stepped automatically to step 242 (via point C in the flow diagram). The condition becomes false if none of the answer keys is pressed down during the time period. In step 242, the control unit initiates the termination routine and when this has been gone through (step 244), the terminal is terminated.

If, on the contrary, one of the answer keys (176 or 178) is pressed down, the condition in step 224 is true (YES), and the condition "positive" in next step 230 is tested. If the answer key "NO" 178 is pressed down (the condition "positive" is thus not fulfilled), the user does not want to use the stored reserve power, and the control unit automatically starts the termination step 242 (via point C in the flow diagram). If the answer key "YES" 176 is pressed down and the condition is thus fulfilled, the step 230 follows (via point B in the flow diagram), in which the control unit 120 temporarily sets the parameter A to 0 (zero) in the data storing unit 124. In the next step 234, the control unit 120 transmits the value A=0 of the activation parameter as an instruction in the form of a control signal from the data storing unit 124 via the control unit 120 to the reference value selector 50 so that the reference value parameter R is given the value R(0). The instruction thus designates which reference value is to be selected. Step 234 also includes that the actual reference value R(0) is transmitted to the comparing means 32 and is used in the forming of the difference CL−R(0). This difference forms the signal $U_{dif}$=(CL−R(0)). In step 236, the control unit 120 fetches $U_{dif}$ at the input 134 and stores the value $U_{dif}$ temporarily at the address provided in the data storing unit 124. The control unit 120 tests in step 238 if the condition that "$U_{dif} \leq 0$" is true. The iteration of steps 236 and 238 goes on as long as the condition "$U_{dif}$" is not fulfilled (NO). The iteration stops when the condition is true (YES) and continues to step 240, in which the control unit 120 sets the activation parameter A to its original value A=1 (the function Reserve Power Storage activated) in the data storing unit 124. If the user should log off the terminal before all reserve power is spent and the condition and the condition that "$U_{dif} \leq 0$" is not true, the control unit 120 nevertheless sets the activation parameter A to its original value A=1 before the termination routine is started. Otherwise, the user would lose his pre-setting to have reserve power storage activated. The user can thus depend on that the function Reserve Power Storage is, as he had wished, activated even if there has been a change of or a charge of the power delivery unit before all reserve power was used. Thereafter, the control unit 120 starts the termination routine in step 242, which logs off the terminal when the routine has been completed (step 244).

In the following section a second embodiment of the invention is presented.

Figure 8A:
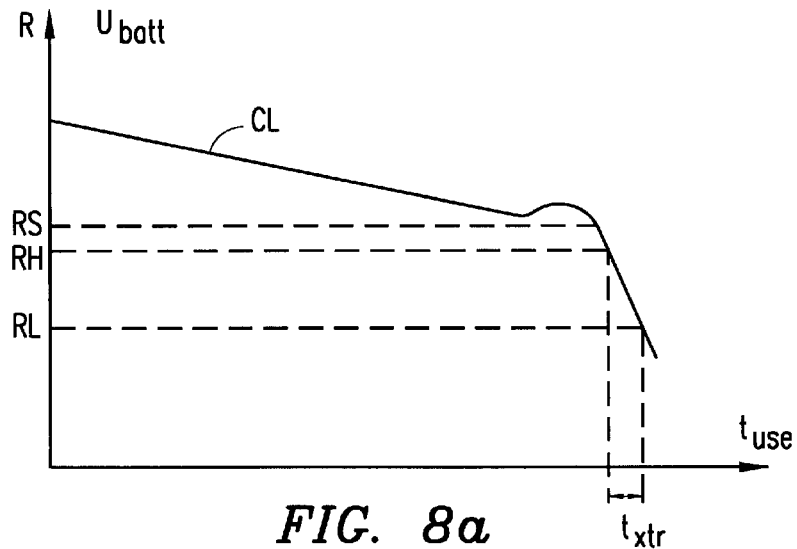
FIGS. 8a, 8b and 8c show the same curve graph as FIG. 2, but with a further reference value RS drawn.
Figure 8B:
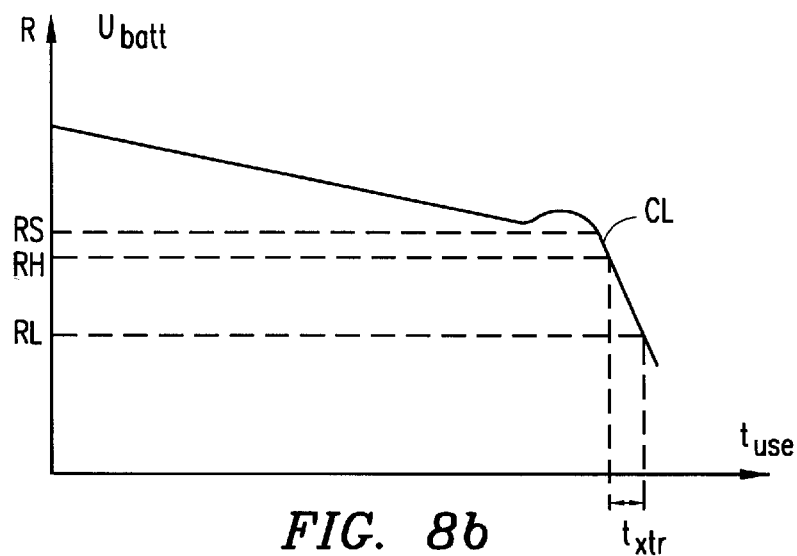
Figure 8C:
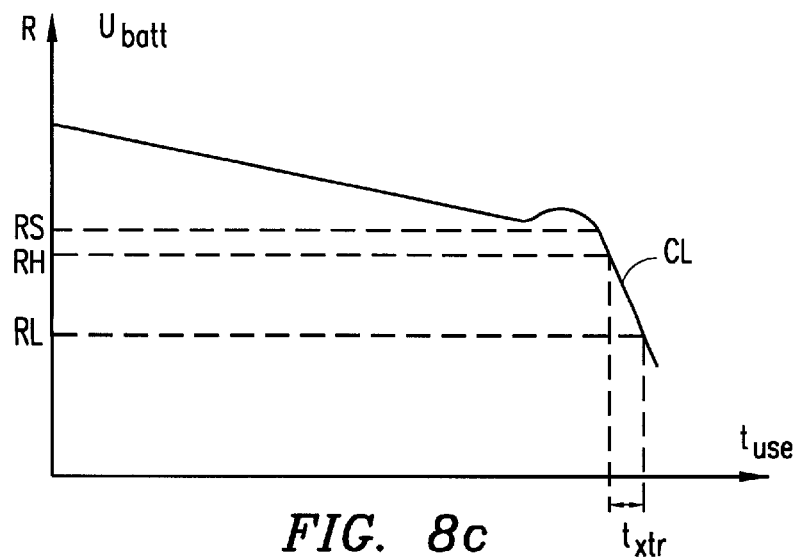

The battery characteristic according to the graphs of FIGS. 8a–c correspond to the graph of FIG. 2. The given reference values RH and RL correspond to the first reference value R(1) and the second reference value R(0). In these diagrams, a further reference value RS has been drawn. This reference value RS is used in this embodiment for judging whether the battery was charged while the terminal was turned off. Thus, FIG. 8a shows when the matched measuring signal CL of the battery voltage exceeds the reference value RS, whereby the control unit 120 automatically will give the reference value selector 50 the instruction to choose the reference value R=RH.

FIG. 8b shows the situation which would occur when the terminal is activated and the matched measuring signal CL of the battery voltage is lower than the reference value RS. The control unit 120 hereby gives to the reference value selector 50 the instruction to select the reference value R=RH and thereby utilizes the latest ordinary charging in the power supply unit 12, before the reserve power would possibly have to be used.

FIG. 8c shows when the matched measuring signal CL of the battery voltage is lower than the reference value RL, whereby the user must use the reserved charge in order to be able to use the terminal.

The invention according to the following alternative method solves the described three situations in a way which is smooth and easy for the user, which will be described in the following part of the description.

This embodiment of the invention means that reserve power is always reserved when the battery voltage exceeds the reference value RH. The user can only choose between utilizing or not utilizing the reserve power reserved.

Figure 9A:
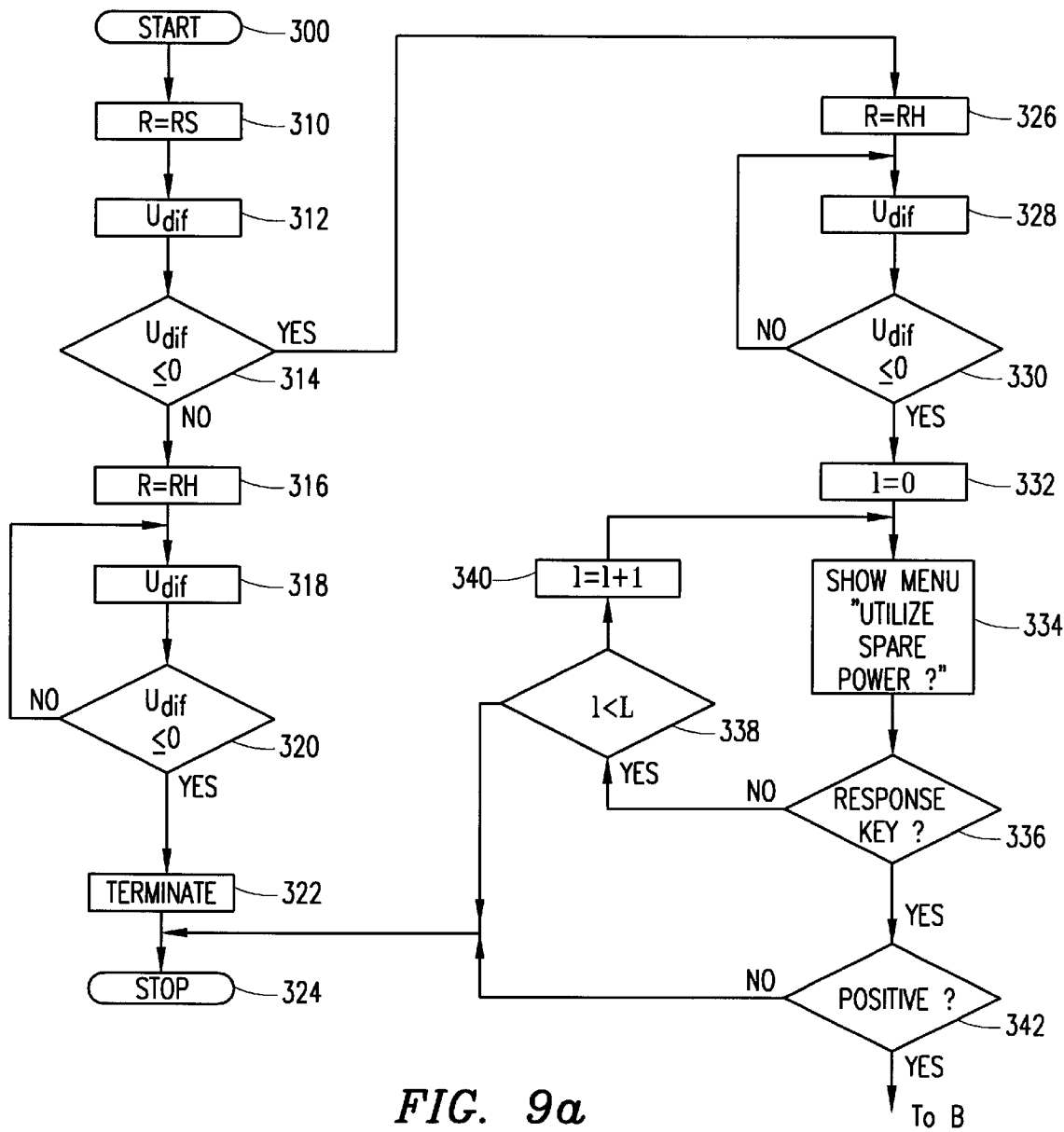
FIGS. 9a and 9b show a flow chart of a second method according to the invention.
Figure 9B:
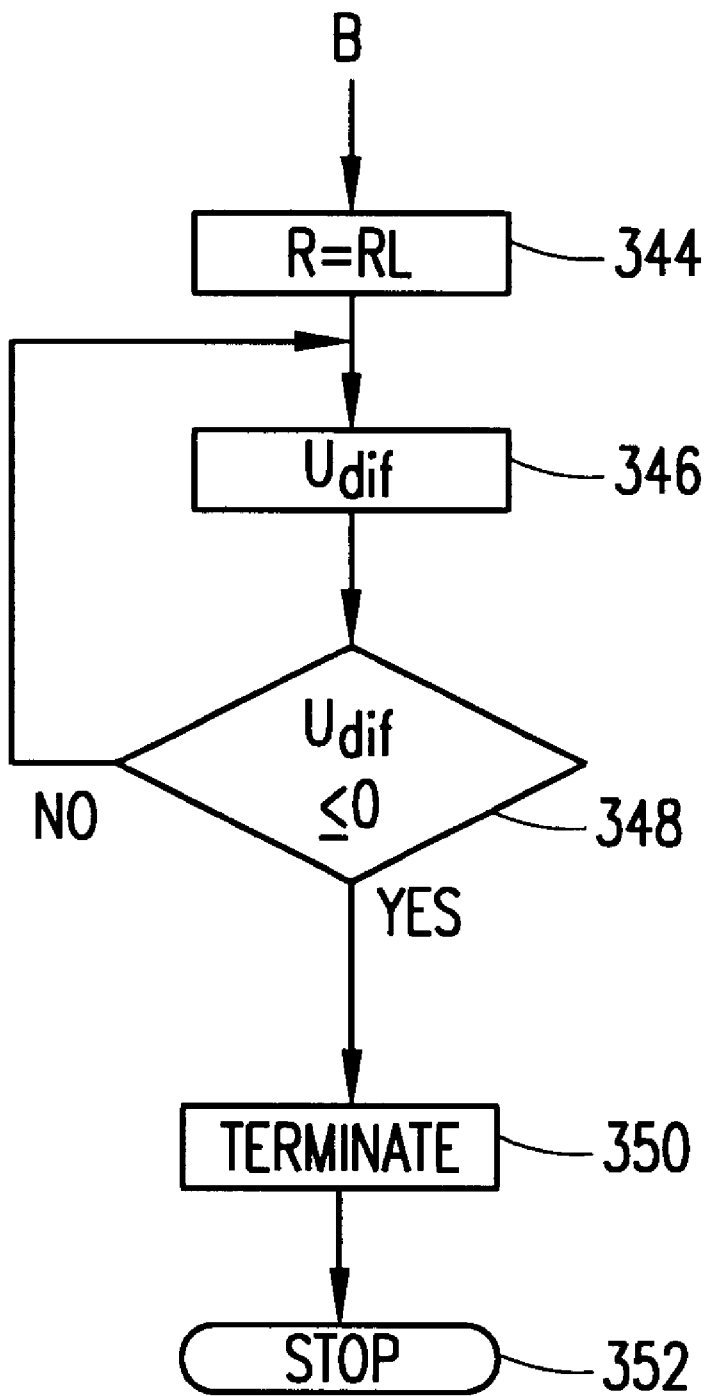

In FIGS. 9a and 9b, there is shown a flow diagram of a second method according to the invention. The process starts in step 300 at the activation of the terminal. Directly after start, the value of the reference value R is set to R=RS in step 310. Step 310 also includes that the actual reference value RS is transferred to the comparing means 32 and is used in the difference formation of CL−RS. This difference forms the signal $U_{dif}$=(CL−RS), which in step 312 is fetched directly from the input 134 of the control unit 120 which is connected to the comparing device (32 in FIG. 4). In step 314, there is tested if $U_{dif}$ is greater or smaller than zero. If $U_{dif}$ is greater than zero, the condition is not fulfilled and the process continues in step 316. Step 316 includes also that the actual reference value RH is transferred to the comparing means 32 and is used in the difference formation of CL−RH. This difference forms the signal $U_{dif}$=(CL−RH), which is fetched directly from the input 134 of the control unit 120 which is connected to the comparing device (32 in FIG. 4). In step 320, $U_{dif}$ is compared to the value zero until the condition is fulfilled that the difference is less than zero. The iteration of steps 318 and 320 proceeds as long as the condition "$U_{dif}$" is not fulfilled (NO). When the condition is fulfilled (YES), the termination routine is performed in step 322, which logs off the terminal when the routine is completed (step 324).

If the test of the condition "$U_{dif}$<0" in step 314 is true (YES), reference value RS, in the next step, step 326, is changed for the lower reference value RH. Step 326 also includes that the actual reference value RH is transferred to the comparing means 32 and used in the difference formation CL−RH. In step 328, the signal $U_{dif}$=(CL−RH) is formed and fetched. In step 330, there is tested whether $U_{dif}$ is less than zero. If the condition is not fulfilled (NO), the steps 328 and 330 are re-iterated until said condition is fulfilled (YES), whereby the process continues in step 332. In this step, an iteration variable l is set to zero (l=0). In step 334, a menu "USE RESERVE POWER ?" is initiated and shown. The user of the terminal is then expected to give an answer "YES" or "NO" by pressing one of the two answer keys "YES" (176) or "NO" (178) within a certain time period. The menu is shown on the display unit of the terminal during this reselected time period, which corresponds to L number of iterations. For each iteration, there is tested in step 338 whether the condition "l<L" is fulfilled. If the condition is not fulfilled, 1 is added to the variable l in step 340. The iteration of steps 336, 338 and 340 proceeds until the condition is false (NO), whereby the sequence is automatically stepped to step 322. The condition becomes false if none of the answer keys (176 or 178) was pressed during the time period. In step 322, the termination routine is initiated, and when it has been completed (step 324), the terminal is terminated.

If, on the other hand, one of the answer keys is pressed down, the condition in step 336 is true (YES), and therefore the condition "positive" in the next step 342 is tested. If the answer key "NO" (178) is pressed down (the condition "positive" is thereby not fulfilled), the user does not want use the stored reserve power, and the sequence then automatically goes to the termination step 322. If the answer key "YES" (176) is pressed down and the condition is thus fulfilled, step 344 will follow (via the point A in the flow diagram). In this step, the reference value RH is exchanged for the lower reference value RL. Step 346 also includes that the actual reference value RL is transferred to the comparing means 32 and used in the difference-formation CL−RL. This difference forms the signal $U_{dif}$=(CL−RL) which is fetched from the input 134 of the control unit. In step 348, $U_{dif}$ is compared to the value zero until the condition that the difference is less than zero is fulfilled. The iteration of steps 346 and 348 proceeds as long as the condition "$U_{dif}$" is not fulfilled (NO). When the condition is fulfilled (YES), the termination routine is performed in step 350, which logs off the terminal when the routine is completed (step 352).

The following part of the description has the object of explaining the function of a terminal, which includes the second embodiment of the invention. The text and reference numerals refer to FIGS. 2, 3, 4, 8a–8c and 9a–9b.

The process starts in step 300 by activating the terminal. In step 310, directly after start, the control unit sets the value of the reference value R to R=RS. The reference value RS is fetched from a memory address or a table in the reference value selector 50. The control unit 120 fetches an instruction from the data storing unit 124. The instruction is transferred as a control signal via the control unit 120 to the reference value selector 50. The control signal recites to the reference value selector 50 which reference value is to be assigned to the reference value parameter R. Step 310 also includes that the reference value selector 50 transfers the actual reference value R=RS to the input 130 of the comparing means 32. The comparing means 32 includes an A/D transformer which transforms an analogue measuring signal CL, which is a measure of the charge and voltage of the battery, to a digital signal CL the binary value of which corresponding to the measuring value of the analogue signal. If the signal source is a battery, the signal is an A/C voltage and the measuring value the amplitude of the signal.

When the measuring value has been transformed into a digital signal CL, there is formed a difference signal $U_{dif}$ by subtracting the reference value RS from CL. In step 312, the control unit 120 fetches the signal $U_{dif}$=(CL−RS) directly from the input 134, which is connected to the comparing means 32. The control unit 120 can temporarily store $U_{dif}$ at an address in the data storing unit 124.

The signal $U_{dif}$=(CL−R) at the output of the A/D transformer is used both as a signal for the battery-charging indication of the terminal and the reserve power function.

In step 314, the control unit tests whether $U_{dif}$ is greater or smaller than zero. If $U_{dif}$ is greater than zero, the condition is not fulfilled, and the process continues in step 316. In this step, the control unit 120 exchanges the reference value RS for the lower reference value RH. The reference value RH is fetched from a memory address or a table in the reference value selector 50. The control unit 120 fetches an instruction from the data storing unit 124. The instruction is transferred as a control signal via a control unit 120 to the reference value selector 50. Step 314 also includes that the reference value selector 50 transfers the actual reference value R=RH to the input 130 of the comparing means 32. The actual reference value is used in the difference formation CL−RH. This difference forms the signal $U_{dif}$=(CL−RH), which in step 318 is fetched by the control unit 120 at the input and temporarily stored at an address in the data storing unit 124.

In step 320, the control unit 120 compares $U_{dif}$ with the value zero until the condition is fulfilled that the difference is less than zero. The iteration of steps 318 and 320 proceeds as long as the condition "$U_{dif}$" is not fulfilled (NO). When the condition is fulfilled (YES), the control unit performs the termination routine in step 322, which makes the terminal to log off when the routine is completed (step 324).

If the test of the condition "$U_{dif}$<0" in step 314 is true (YES), the control unit 120 in the next step (step 326) exchanges the reference value RS for the lower reference value RH. The reference value RH is fetched from a memory address or a table in the reference value selector 50. The control unit 120 fetches an instruction from the data storing unit 124. The instruction is transferred as a control signal via the control unit 120 to the reference value selector 50. The step 326 also includes that the reference value selector 50 transfers the actual reference value R=RH to the input 130 of the comparing means 32. The actual reference value is used in the difference formation CL−RH in the comparing means 32. This difference forms the signal $U_{dif}$=(CL−RH), which is connected to one of the inputs 134 of the control unit. In step 328, the control unit 120 fetches the signal $U_{dif}$=(CL−RS) directly from the input 134, which is connected to the comparing means 32. The control unit 120 can temporarily store $U_{dif}$ at an address in the data storing unit 124.

In step 330, the control unit 120 tests the condition whether $U_{dif}$ is less than zero. The iteration of the steps 328 and 330 proceeds as long as the condition "$U_{dif}$" is not fulfilled (NO).

If, on the other hand, the condition is fulfilled (YES), the process continues in step 332. In this step, the control unit sets an iteration variable 1 to zero (l=0). In step 334, the control unit 120 initiates by means of the menu system 160 that a user menu with the text "USE RESERVE POWER?" is shown on the display unit. The terminal user is then expected to give an answer "YES" or "NO" by pressing one of the two answer keys "YES" 176 or "NO" 178 within a certain time period. The menu is shown at the display unit of the terminal during this preselected time period, which corresponds to L iterations. In step 338 is tested whether the condition "l<L" is fulfilled for each iteration. In step 340 is added 1 to the variable l. The iteration of steps 336–340 proceeds until the condition is false (NO), whereby the sequence is automatically stepped to step 322. The condition becomes false if none of the answer keys 176 or 178 is pressed down during the time period. In step 322, the termination routine is automatically initiated, and when this has been performed (step 324), the terminal is terminated.

If, on the other hand, one of the answer keys 176 and 178 is pressed down, the condition in step 336 is true (YES), and therefore the condition "positive" in the next step 342 is tested. If the answer key "NO" 178 is pressed down (the condition "positive" is thus not fulfilled), the user does not want to use the stored reserve power, and the sequence will automatically go to the termination routine in step 322. If the answer key "YES" 176 is pressed down and the condition is thus fulfilled, the step 344 will follow (via point A in the flow diagram). In this step the control unit exchanges the reference value RH for the lower reference value RL. The reference value RH is fetched from a memory address or a table by the reference value selector 50. The control unit 120 fetches an instruction from the data storing unit 124. The instruction is transformed as a control signal via the control unit 120 to the reference value selector 50. Step 344 also includes that the reference value selector 50 transfers the actual reference value R=RL to the input 130 of the comparing means 32. The actual reference value is used in the difference formation CL−RL in the comparing means 32. This difference forms the signal $U_{dif}$=(CL−RH), which is connected to one of the inputs 134 of the control unit. In step 346, the control unit 120 fetches the signal $U_{dif}$=(CL−RS) directly from the input 134, which is connected to the comparing means 32. The control unit 120 may temporarily store $U_{dif}$ at an address in the data storing unit 124.

In step 348, the control unit 120 tests the condition if $U_{dif}$ is less than zero. The iteration of steps 346 and 348 continues as long as the condition "$U_{dif}$" is not fulfilled (NO).

When the condition is fulfilled (YES), the termination routine is performed in step 350, which logs off the terminal automatically when the routine has been performed (step 352).

In the methods described above it is easy to get at the reserve power. The user may use the reserve power after having answered "YES" by key pressing when the user menu was shown. In order to secure the reserve power stock from being used unnecessarily, it may be advantageous to block the reserve power. If the user wants to get at the reserve power, he has to pass an unlockable blocking. The blocking function is obtained by completing the invention with an unlockable blocking means for blocking the use of the reserve power. This blocking means comprises a comparator and a memory means.

In order to unlock the blocking function, a code is needed which is preprogrammed by the manufacturer, the seller or the user himself.

Two types of blocking functions are possible—one type which is always activated and one type which is possible to activate and inactivate. For a user it is useful to be able to select whether the blocking function is to be activated (on) or inactivated (off). This blocking means comprises, beside a comparator and a memory means, also a marker for marking whether the blocking function is activated or inactivated. The selection is made in a specially provided blocking function menu in the menu system. The blocking function may be activated and inactivated when this menu is shown. The selection of menu and working mode, activated or inactivated, is made in a way equivalent with that described in connection with FIGS. 6 and 7. The function may be activated any time. The user may also, by means of the blocking function menu, read whether the function is activated or inactivated. The blocking function is only active when the user wants to get at the reserve power. The blocking function must not be inactivatable via the blocking function menu simultaneously, as the function is active.

Figure 12:
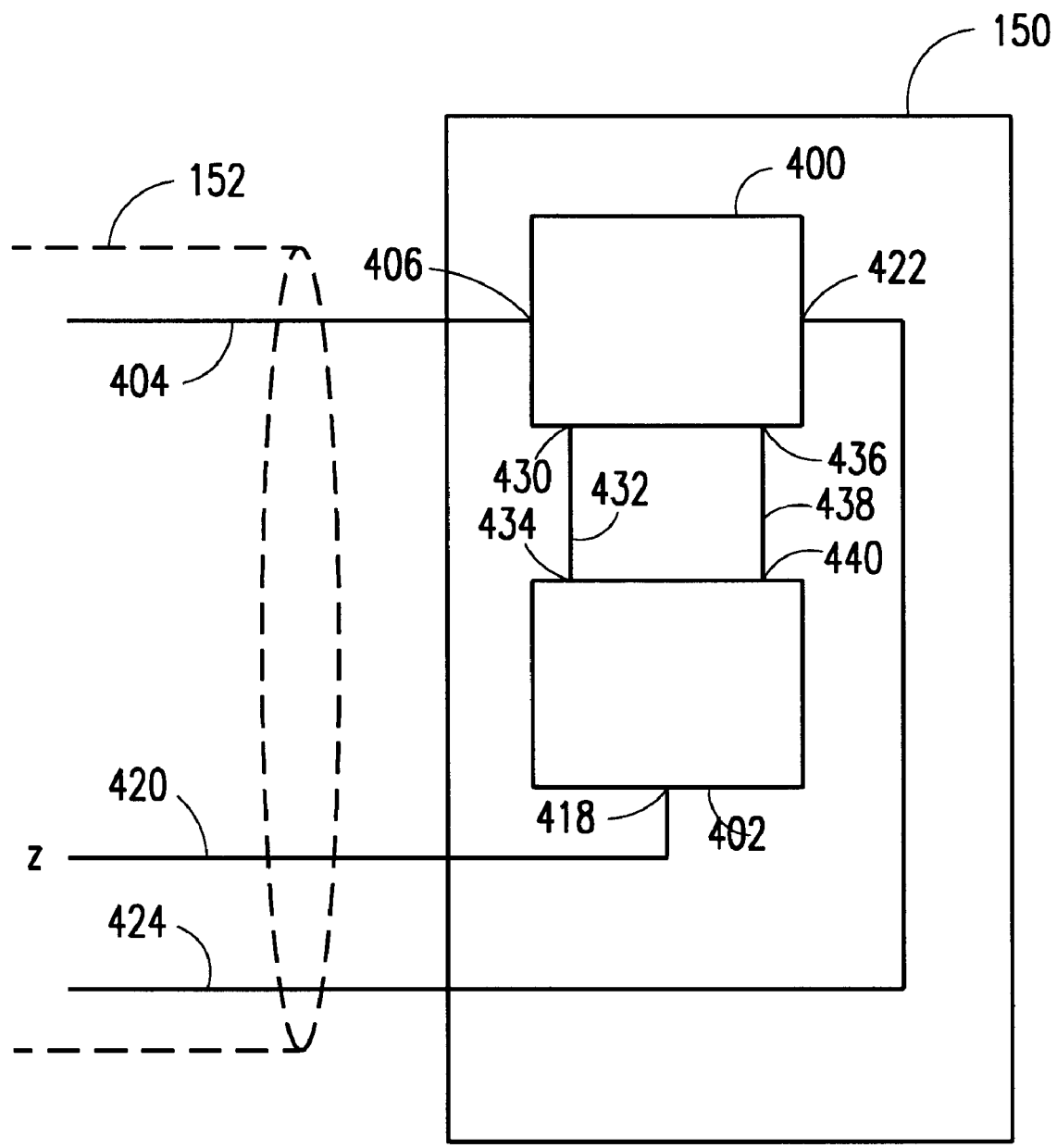
FIG. 12 shows a further embodiment of a blocking means.

The blocking function, which is possible to activate and inactivate, comprises said blocking means and also a marker (also called a flag or a pointer), which either is arranged in the data storing unit 124 (blocking means according to FIG. 10) or in a memory means 400 in the blocking means 150 (see FIG. 12). If the user denotes that he wants to use the reserve power, the control unit 120 controls in the data storing unit 124 or in the memory means 400 whether the marker (flag/pointer) points at the blocking means 150 being activated or inactivated. If the marker points at the blocking means being activated, the blocking function becomes active and the blocking means blocks a change of reference value.

The marker arrangement in the data storing unit 124 or the memory means 400 is superfluous if the blocking function is always activated.

The unlocking process starts after a user menu is shown and a user denotes that he wants to use the reserve power. The control unit controls whether the marker (the flag) is pointing at the blocking means being activated or inactivated. If the marker points at the blocking means being activated, the blocking function becomes active (blocking) and the blocking means blocks a change of the reference value. In this position, the control unit activates the menu system to show the unlocking menu. If the user denotes a code, this is tested in the blocking means against the preprogrammed correct code. The blocking means comprises a digital comparator, which is constructed of logical gates. In the comparator, the two codes are compared. The blocking means emits an allowance signal when the codes are the same and an error signal when the codes are different. The control unit senses which signal the blocking means emits.

An allowance signal means that the blocking function is unlocked, whereupon the control unit initiates a change of the reference value parameter R from the higher value RH to the lower reference value RL in any of the ways described above. The stored reserve power in the sole energy storing unit can now be utilized.

If the control unit emits an error signal from the blocking means, the exchange of the reference value is blocked. The user has only a limited number of unlocking trials available. If the user fails in the given number of attempts to unlock the blocking means, no reference value change will take place and the terminal will be logged off.

In the following, the method for unlocking the blocking means will be described.

Figure 10:
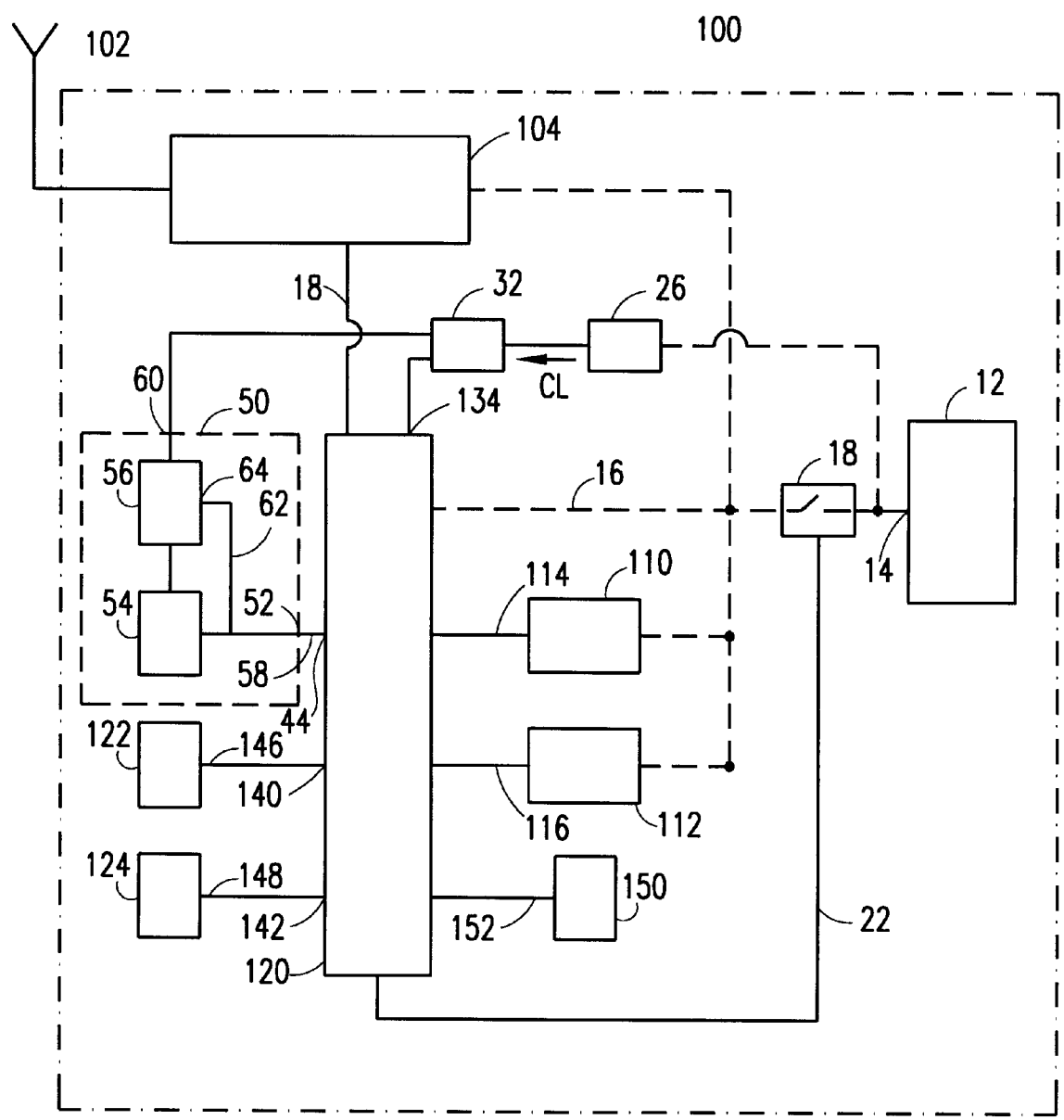
FIG. 10 shows a block diagram of a terminal for mobile radio communication, which terminal includes a unlockable blocking means.

FIG. 10 shows a block diagram of a terminal for mobile radio communication, which terminal comprises an unlockable blocking means 150 for blocking the use of the reserve power reserved in the sole storing unit of the terminal for electric charge. For the rest, the terminal corresponds to the terminal as presented in FIG. 4 with appended text. The following presentation is directed to the presentation of how the inventive unlockable blocking means is arranged in the terminal and how it cooperates with certain other units in the terminal.

The blocking means 150 is connected to the control unit 120 via the lead bus 152. In the blocking means, the preprogrammed correct unlocking code is tested against the code stated by the user. The unlocking code may be stored in the data storing unit 124 and be fetched by the control unit 120 to the blocking means 150 when the test is to be made. Alternatively, the unlocking code alone may be stored in the blocking means 150 in a memory means.

The code denoted by the user is tested in a digital comparator comprised in the blocking means 150, which comparator is constructed from logical gates. In the comparator, the two codes are compared. The comparator in the blocking means emits an allowance signal at the lead bus 152 when the codes correspond or an error signal when the codes are different. The control unit senses which signal the blocking means emits.

Figure 11:
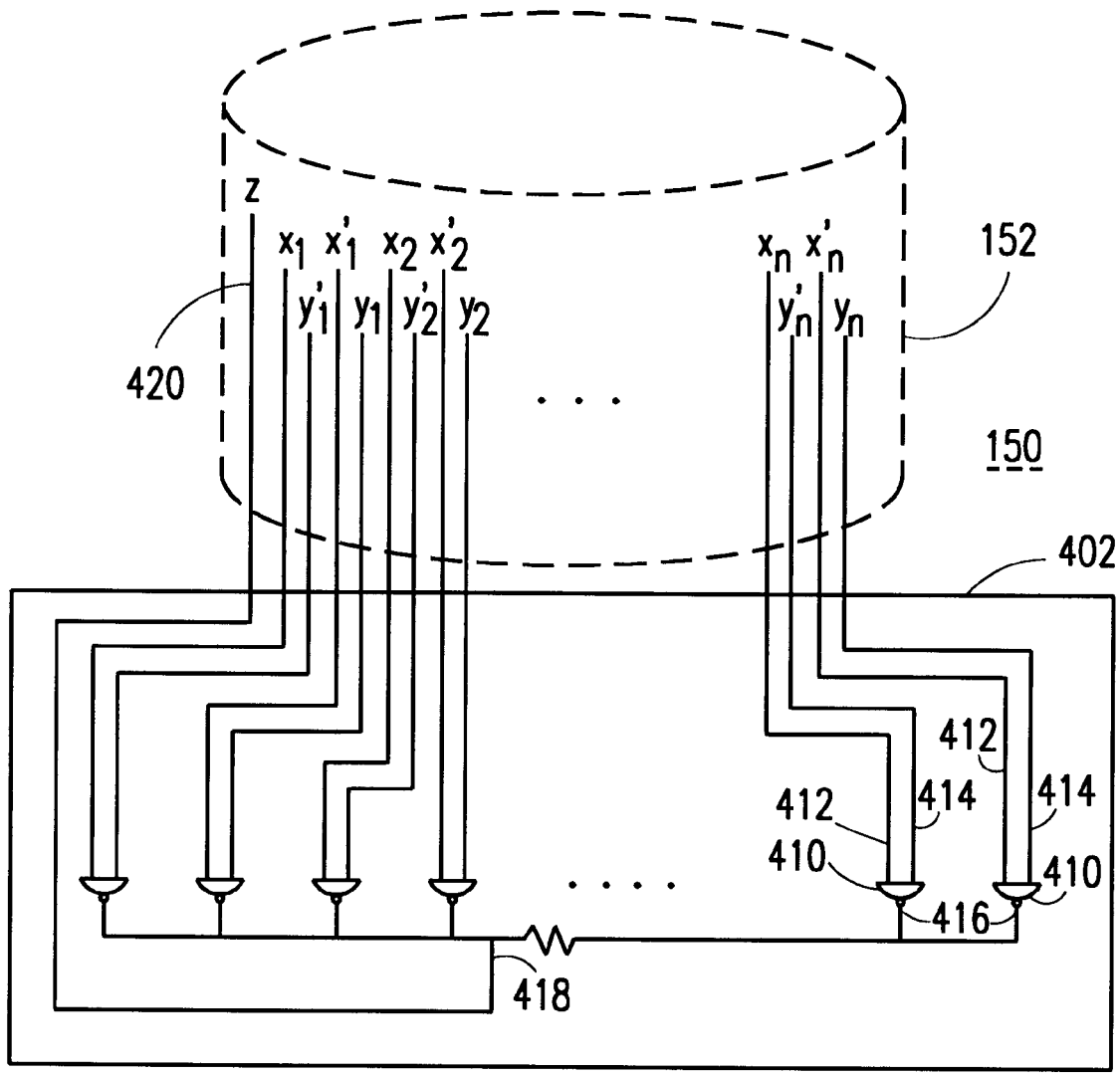
FIG. 11 shows an embodiment of a blocking means.

FIG. 11 shows an embodiment of a blocking means 150. The blocking means comprises a digital comparator 402, which is realized by means of wired NAND-gates 410. If the two code words to be compared consist of n bits each, 2×n NAND-gates are needed. Each NAND-gate has two inputs, 412 and 414. The product of the inputs is inverted at the output 416, and the outputs 416 from the different gates 410 are coupled together (wired) to one sole common output 418. A channel 420 in the common bus 152 connects the output 418 to the control unit 120.

An unlocking code consists of a number of positions and is represented in a user interface by the numbers 0–9 or by letters of the alphabet. In the terminal, the code is, however, represented by bits $(x_n; y_n)$ which take values of 1 or 0. Each bit $y_n$ in the code Y has a position n, n=1, 2, 3, . . . . Thus, the binary unlocking code may be expressed by $Y=(y_1, y_2, y_3, \ldots, y_n)$. When a code designated by the user, $X=(x_1, x_2, x_3, \ldots, x_n)$ is compared with a correct unlocking code $Y=y_1, y_2, y_3, \ldots, y_n)$, a "logical one" (1) at the output 418 is obtained if, and only if, the condition $x_1=y_1$, $x_2=y_2$, $x_3=y_3, \ldots, x_n=y_n$ is fulfilled. The output signal z can be written as $z=(x_1y_1'+x_1'y_1+x_2y_2'+x_2'y_2+ \ldots +x_ny_n'+x_n'y_n)'$. (The inverted value of the bit $x_n$ is written as $x_n'$). This expression for z has an AND-NOR-structure and is realized by wired NAND-gates. The expression can be deduced from a more general expression for the output of a comparator, viz. $z=(x_1 \oplus y_1)'(x_2 \oplus y_2)' \ldots (x_n \oplus y_n)'$. From this expression, other realizable structures may be deduced.

In FIG. 11, the expression $z=(x_1y_1'+x_1'y_1+x_2y_2'+x_2'y_2+ \ldots +x_ny_n'+x_n'y_n)'$ is realized by wired NAND-gates, one for each term of the expression. The uninverted bit $x_n$ in position n of the binary code X is multiplied logically with the inverted bit $y_n (=y_n')$ in the corresponding position n in the binary code Y in one of the gates of the comparator, while simultaneously in another of the gates of the comparator there occurs a logical multiplication of the uninverted bit $y_n$ with the inverted bit $x_n (=x_n')$. Thus, it takes two gates for each position n in the binary coded codes X and Y.

FIG. 11 shows an embodiment, in which the uninverted value and the inverted value each have a channel for each bit. The number of channels in the data bus 152 is halved if only the uninverted value of each bit in a position n is transferred in said conductor. The inverting operation is solved by connecting each channel to an uninverted input on a NAND-gate and an inverted input on another gate. Thus, each NAND-gate in this realization will have an uninverted and an inverted input. Each channel is thus connected alternately to an uninverted and an inverted input.

FIG. 12 shows a further embodiment of a blocking means 150. The blocking means 150 is connected to the control unit 120 via the lead bus 152. In the blocking means 150 itself, a memory means 400 and a comparator 402 are arranged. The memory means 400 is implemented with a RAM-memory or register. Possible comparator solutions have been described in connection to FIG. 11. Depending on which type of comparator and memory realization is selected, also matching circuits may be necessary to arrange in the blocking means 150. The matching circuits may consist of delay elements, inverters and different types of gates and flipflops.

In that case, the lead bus 152 includes an address-, control- and data bus 404, a signal bus 420 and a second signal bus 424. The bus 404 is connected to an input port 406 in the memory means 400. The memory means 400 stores the correct code Y and the code X given by the user. In the memory means 400 there is also set a marker (flag or pointer) which designates if the blocking function is activated or inactivated. The memory means has 3 output ports. The second signal bus 424 earlier mentioned is connected to an output port 422. Via the signal bus 424, information is transferred which is stored in the memory means 400 to the control unit 120. The status of the blocking function (activated or inactivated) is an example of such type of information.

The comparator 402 has two input ports—one input 434 for the code X and one input 440 for the code Y. The input 434 is connected via a data bus 432 to an output port 430 of the memory means 400, and the input 440 is connected via a data bus 438 to an output port 436 of the memory means 400. The comparator 402 has an output port 418, which is connected to the control unit 120 via said first data bus 420. The output signal z is the result of the comparison made. The output signal z is either an approval signal or an error signal. Only if the codes X and Y are equal will there be an approval signal, leading the control unit 120 to initiate a change of reference value.

Figure 13:
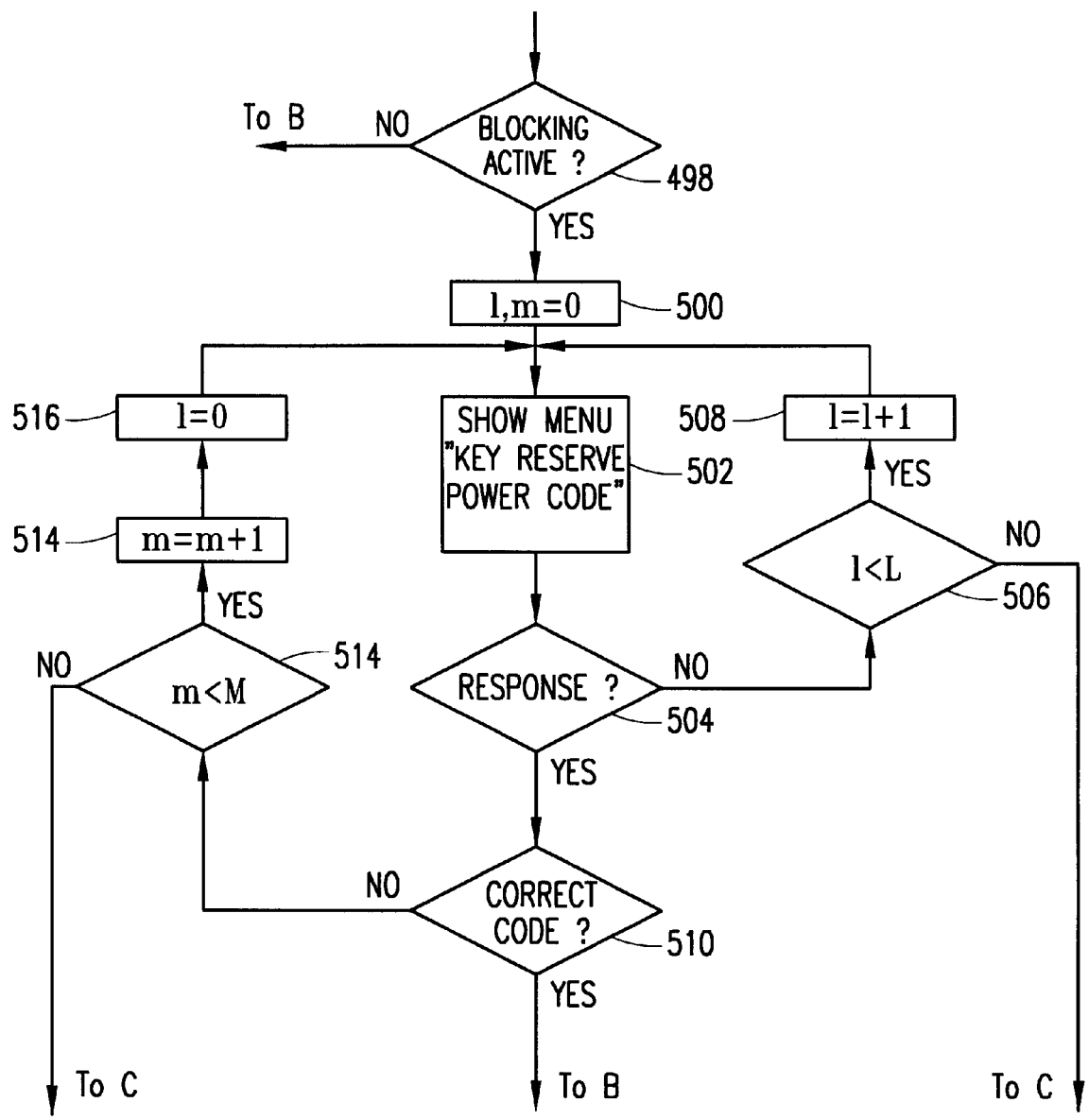
FIG. 13 shows a flow diagram of the inventive unlocking method.

In FIG. 13 is presented a flow diagram of the invented unlocking method, which is fit in the process for reserving and using reserve power. The unlocking method is entered at the point B in the flows already described and which are illustrated in the flow diagrams of FIGS. 7a–7c and 9a–9b.

In the flow diagrams shown above, a point B (also called the position B) is inserted.

In the flow diagram, which is divided into FIGS. 7a–7c, the point B is inserted between the steps 230 and 232. In the flow diagram, which is divided into FIGS. 9a–9b, the point B is inserted between the steps 342 and 344.

In the same way, in the flow diagrams shown above, a point C (also called position C) is inserted. In the flow diagram divided into FIGS. 7a–7c, the point C is inserted between the steps 240 and 242. In the flow diagram divided into FIGS. 9a–9b, the point B is inserted between the steps 320 and 322.

The unlocking process starts with step 498. Here is tested whether the blocking function is activated or inactivated. If the blocking function is inactivated, the answer of the test condition is negative (NO) and the process continues to point B and step 232 of the use routine (FIG. 7c) or 344 (in FIG. 9b), respectively. If the blocking function, on the other hand, is activated, the answer to the test condition is positive (YES) and the process continues to step 500. In this step 500, two iteration variables m and l, respectively, are set are set to zero (l,m=0). In step 502 there is initiated and shown an unlocking menu "TYPE RESERVE POWER CODE". If the user does not take any action and answers by typing in a code, the menu will be shown at the display unit of the terminal during a preselected time, corresponding to L iterations. In step 504 it is tested whether the user has answered. If the user has not answered, the test is negative (NO) and the iteration continues by step 506. For each iteration it is tested whether the iteration variable l is less than L, i.e. that the condition "l<L" in step 506 is true. For each iteration that the condition is true, 1 (one) is added to the iteration variable l in step 508. As long as the condition in step 506 is true (YES), the iteration continues by the steps 502–508. Each step in the program sequence is made in step with the clock frequency of the control means, or the control unit. Said iteration, the steps 502–508, can be discontinued in two manners. The first manner happens when the condition in step 506 is no longer true (NO), whereby the sequence is automatically stepped to the point C in the flow diagrams and further to the termination step in the respective flow diagram, FIGS. 7a–7c and 9a–9b. The second manner is that the user answers, whereby the test in step 504 is true and the sequence continues further to step 510.

In step 510 it is tested whether the user has given the right code. If the user does not succeed to give the right code in the first attempt, he has nevertheless a further number of attempts, totally M. If thus the test in step 510 is negative (NO), the iteration continues with step 512. In step 512 it is tested whether the condition "m<M" is fulfilled. If the condition is fulfilled (YES), there is added 1 to the variable m in next step 514. In the next moment, step 516, the iteration variable l is again set to the value zero. This leads to the user becoming a further time period for typing a code.

The condition in step 512 becomes false if m=M, which means that the user has utilized his M chances to type the right code, and the sequence will then automatically step to point C in the flow diagrams and further to the termination step in the respective flow diagrams, FIGS. 7a–7c and 9a–9b. In the termination step, the termination routine is initiated and when this has been completed, the terminal is terminated.

If, on the other hand, the condition "RIGHT CODE?" in step 510 is true (YES), the iteration is broken and the reserve power blocking is unlocked. The user may now use the locked charge, since the flows proceed from point B in the respective flow diagrams, FIGS. 7a–7c and 9a–9b.

The iteration sequence, steps 502, 504, 510–516, can be broken in two ways. One way is when the condition in step 512 no longer is true (NO), whereby the sequence automatically is stepped to point C in the flow diagrams and further to the termination step in the respective flow diagrams, FIGS. 7a–7c and 9a–9b. The other way is that the user gives the correct code, whereby the test in step 510 is true and the sequence continues to point B in the respective flow diagrams, FIGS. 7a–7c and 9a–9b.

In the following, the unlocking method is described as implemented in a terminal of the type shown in FIG. 10.

The unlocking method starts with step 498. Here the control unit 120 tests whether the blocking function is activated or inactivated. The control unit 120 senses whether the marker in the data storing unit 124 or the memory means in the blocking means 150 points to the blocking function being activated or inactivated. If the blocking function is inactivated, the answer to the test condition is negative (NO), and the process continues to point B and step 232 of the use routine (FIG. 7c) or 344 (FIG. 9b), respectively. Hereby the user does not need to type a code in order to use the reserve power. If, on the other hand, the blocking function is activated, the answer to the test condition is positive (YES) and the process continues to step 500. In this step 500, the control unit sets two iteration variables m and l, respectively, to zero (l,m=0). In step 502, the control unit initiates that an unlocking menu "DESIGNATE RESERVE POWER CODE" is shown at the display unit of the terminal. If the user does take any step and answers by an entered code, the menu will be shown at the display unit of the terminal during a preselected time period corresponding to L iterations. In each iteration of step 504, the control unit senses whether the user has answered. If the user has not answered, the test is negative (NO), and the iteration continues with step 506. For each iteration, the control unit tests whether the iteration variable 1 is less than L, i.e. that the condition "l<L" in step 506 is true. For each iteration where the condition is found true is added 1 (one) to the iteration variable 1 in step 508. As long as the condition in step 506 is true (YES), the iteration continues with steps 502–508. Each step in the program sequence is made simultaneously with the clock frequency of the control means, alternatively the control unit. Said iteration, the steps 502–508, can be broken in two ways. One way occurs when the condition in step 506 is no longer true (NO), whereby the sequence is automatically stepped to point C in the flow diagrams and further to the termination step in the respective flow diagrams, FIGS. 7a–7c and 9a–9b. The other way is that the user answers, whereby the test in step 504 is true and the sequence continues to step 510.

In step 510 the control unit tests whether the user has given the right code by transferring both codes X and Y, respectively, to the comparator in the blocking means 150 for a comparison. The result of this comparison is sensed by the control unit 120 at the output of the comparator via a data bus 420 in the lead bus 152. If the user fails to give the right code in the first attempt, he still has some further attempts, totaling M. If thus the test in step 510 is negative (NO), the control unit continues with step 512. In step 512, the control unit tests whether the condition "m<M" is fulfilled. If the condition is fulfilled (YES), 1 is added to the variable m in the next step 514. In the next moment, step 516, the control unit sets the iteration variable l again to the value zero. This means that the user has a new time period for entering a code.

The condition in step 512 becomes false if m=M, which means that the user has used his M chances to enter the correct code, whereby the sequence is automatically stepped to the point C in the flow diagrams and further to the termination step in the respective flow diagrams, FIGS. 7a–7c and 9a–9b. In the termination step, the termination routine is initiated, and when this has been completed, the terminal is terminated.

If, on the other hand, the condition "RIGHT CODE?" in step 510 is true (YES), the iteration is broken, and the reserve power blocking is unlocked. The user may now utilize the charge which was blocked, since the flows continues from point B in the respective flow diagram, FIGS. 7a–7c and 9a–9b. The condition in step 510 is true when the control unit 120 senses an allowance signal $z_g$ at the output of the comparator in the blocking means 150 via the data bus 420 in the lead bus 152.

The iteration sequence, the steps 502, 504, 510–516, can be broken in two ways. One way occurs when the condition in step 512 is no longer true (NO), whereby the control unit 120 automatically steps to point C in the flow diagrams and further to the termination step in the respective flow diagrams, FIGS. 7a–7c and 9a–9b. The other way is that the user enters the correct code, whereby the test in step 510 is true and the sequence continues to point B in the respective flow diagrams, FIGS. 7a–7c and 9a–9b.

Figure 14:
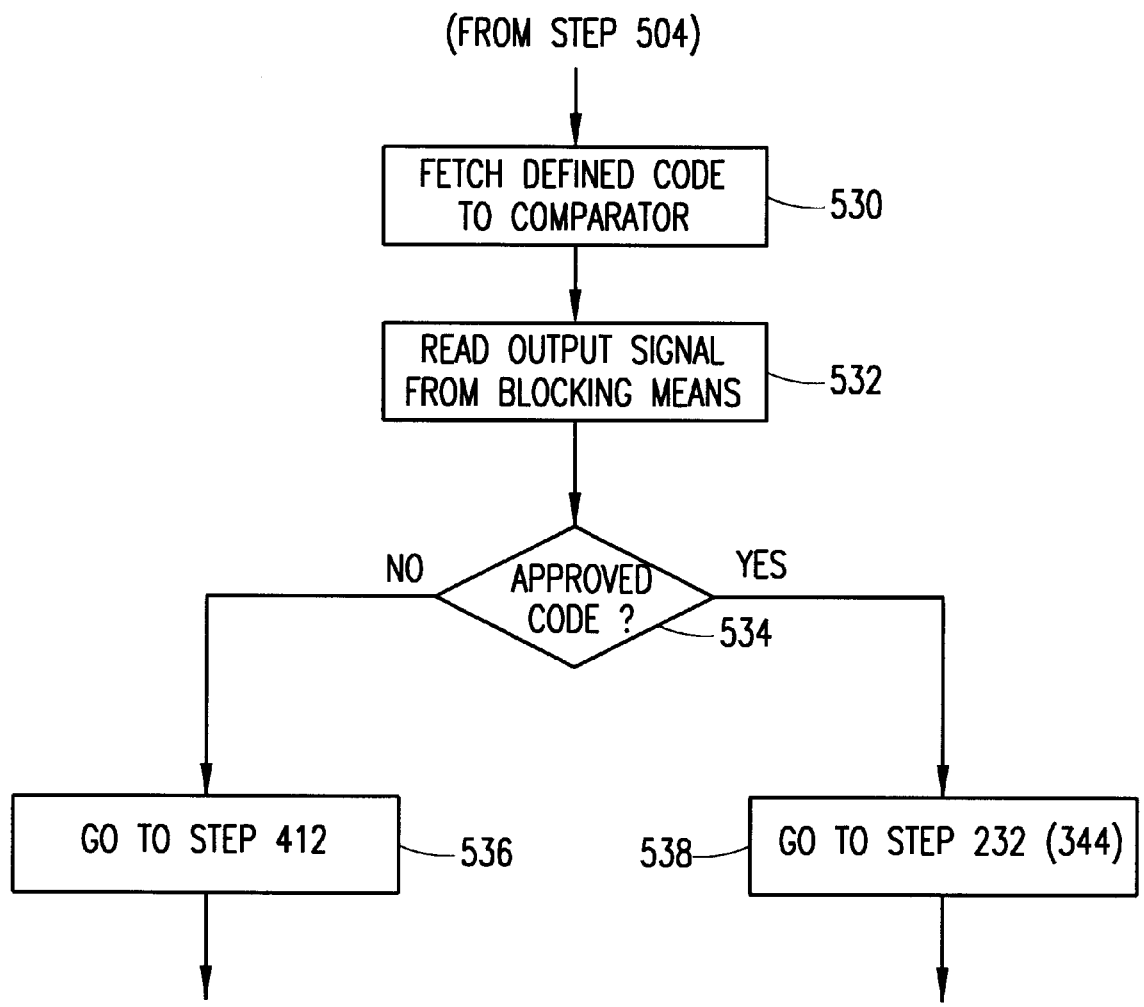
FIG. 14 shows a flow chart of the steps comprised in a preferred testing method, which is a part of the inventive unlocking method.
Figure 7A:
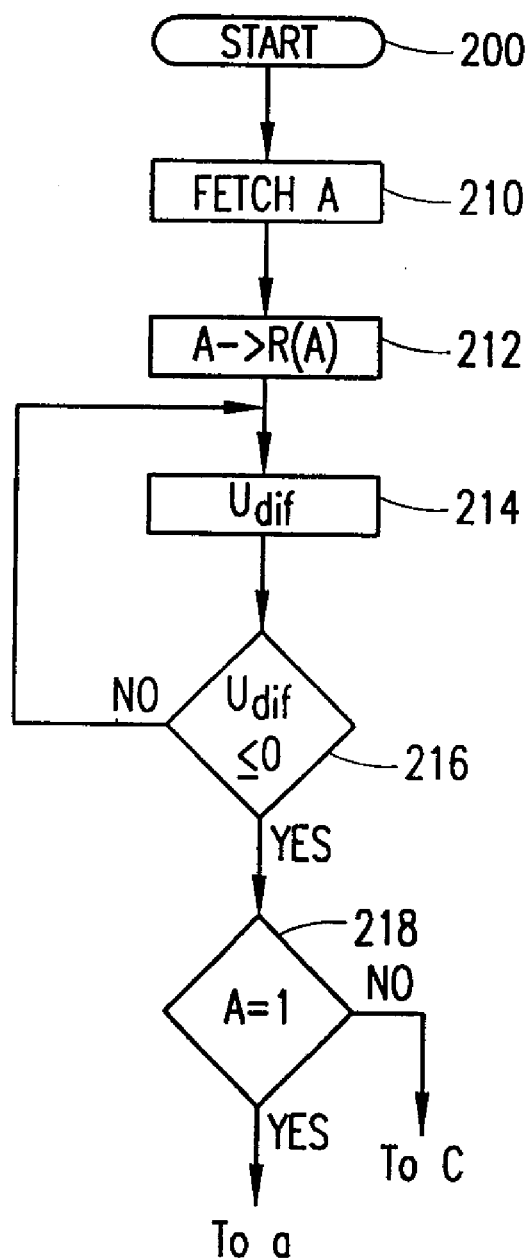
Figure 7B:
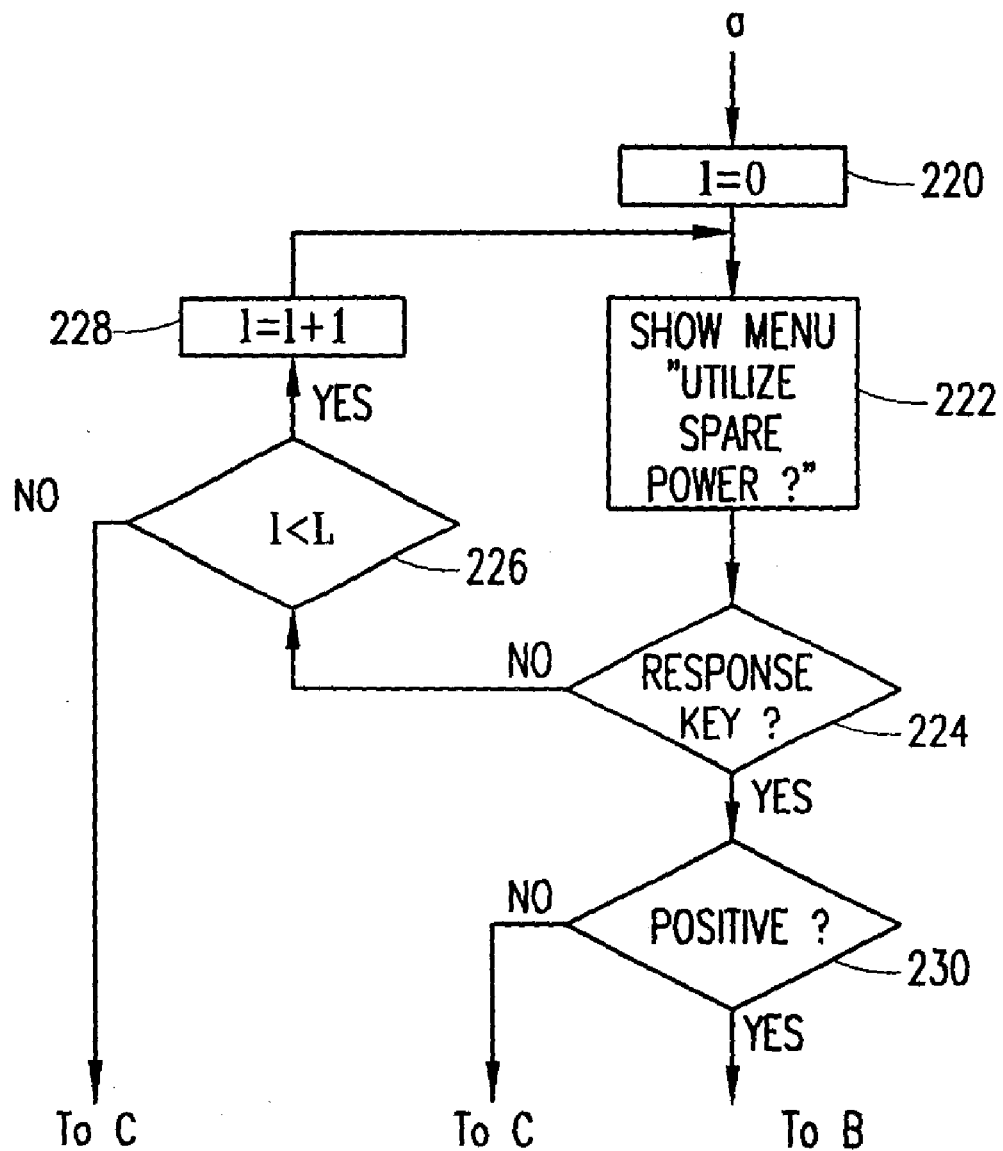

In FIG. 14 are presented the steps which are included in a preferred test method which is a part of the invented unlocking method. In step 510 of the unlocking method, there is tested whether the user indicates the correct code. The user has stated a code which was registered as an answer by the control unit 120. In step 510 (FIG. 13) it is tested whether the code is correct, which can be described by the following test method. In step 530, the code X given by the user and the correct code Y are taken from their memory addresses to the comparator in the blocking means 150. In step 532 the output signal is read from the blocking means. If the output signal is an allowance signal, the condition "approved code" in step 534 is fulfilled and the process continues with step 538, which step means that the unlocking process either continues with step 232 in the first proposed embodiment of the invention according to the flow diagram in FIGS. 7a–7c or continues with step 344 in the second proposed embodiment of the invention according to the flow diagram of FIGS. 9a–9b. If the output signal is an error signal, the condition "approved code" in step 534 is not fulfilled, and the process proceeds with step 512, which step means that the number of unlocking attempts is compared with the number of allowed unlocking attempts M (see the flow diagram according to FIG. 10).

In the following is described how the unlocking process according the flow diagram of FIG. 14 is implemented in the embodiment shown in FIG. 10. In step 530, the control unit 120 transfers the code X given by the user and the correct code Y from their memory addresses to the comparator in the blocking means 150. In step 532, the control unit 120 reads the output signal z from the blocking means 150. If the output signal is an approval signal, the condition "approved code" in step 534 is fulfilled, and the process continues with step 538, which step means that the unlocking process either continues with step 232 in the first proposed embodiment of the invention according to the flow diagram of FIGS. 7a–7c, or continues with step 344 in the second proposed embodiment of the invention according to the flow diagram of FIGS. 9a–9b. If the output signal is an error signal, the condition "approved code" in step 534 is not fulfilled, and the process continues with step 512, which step means that the number of unlocking attempts is compared with the number of allowed unlocking attempts M (see the flow diagram according to FIG. 13).

If the blocking means emits an approval signal, the control unit initiates a change of the reference value parameter R from the higher value RH to the lower reference value RL. The stored away reserve energy in the sole energy storing unit can now be used. In case of an approval signal $z_g$ it is disregarded that the marker in the storing unit 124 indicates that the blocking function is activated.

In case of an error signal from the blocking means, the method steps 502, 504 and 510–516 according to FIG. 10 are just repeated until the user either indicates the correct code or has tried M number of times as described above.

As has been indicated above, these steps are comprised in a preferred test method, which is part of the invented unlocking method according to FIG. 13 and appending text.

What is claimed is:

1. A method for reserving and using reserve power in a mobile radio communication terminal, said terminal including a plurality of functional units and a power supply unit, wherein the power supply unit is the sole common electrical charge storing unit for use by the functional units, said method comprising the steps of:

sensing an electrical charge level of the power supply unit;

generating a reference signal for indicating whether reserve power in the electrical charge storing unit is to be reserved or used by selecting a first reference signal level for the reference signal if the reserve power in the electrical charge storing unit is to be reserved and selecting a second, lower reference signal level if the reserve power is to be used;

comparing the electrical charge level to the reference signal; and allowing operation of the terminal if the electrical charge level is higher than the reference signal.

2. The method of claim 1, further comprising the step of storing an indication of whether the reserve power is to be reserved or is to be used.

3. The method of claim 2, wherein the step of selecting a first reference signal level or a second, lower reference signal level is performed in accordance with the stored indication.

4. The method of claim 1, wherein the step of sensing an electrical charge level of the power supply unit includes transforming the electrical charge level of the power supply unit into a matched measuring signal, and the step of comparing the electrical charge level to the reference signal includes determining a difference between the matched measuring signal and the reference signal.

5. The method of claim 1, wherein the step of selecting a first reference signal level or a second, lower reference signal level is performed in accordance with a selection by a user of the terminal of whether the reserve power is to be reserved or is to be used.

6. The method of claim 1, wherein the electrical charge level has the first reference signal level indicating that the reserve power is to be reserved, said method further comprising the steps of:

detecting that the electrical charge level is less than or equal to the reference signal;

querying a user of the terminal whether the reserve power should be used, said step of querying performed in response to the detection that the electrical charge level is less than or equal to the reference signal;

receiving an indication from the user, in response to said query, that the reserve power is to be used; and replacing the reference signal with a new reference signal having the second, lower reference signal level in response to said indication that the reserve power is to be used.

7. The method of claim 1, wherein the electrical charge level has the first reference signal level indicating that the reserve power is to be reserved, said method further comprising the steps of:

detecting that the electrical charge level is less than or equal to the reference signal; and terminating operation of the terminal in response to the detection that the electrical charge level is less than or equal to the reference signal.

8. The method of claim 1, wherein the electrical charge level has the second reference signal level indicating that the reserve power is to be used, said method further comprising the steps of:

detecting that the electrical charge level is less than or equal to the reference signal, the electrical charge level having the second reference signal level indicating that the reserve power is to be used; and terminating operation of the terminal in response to the detection that the electrical charge level is less than or equal to the reference signal.

9. The method of claim 1, further comprising the step of terminating operation of the terminal in response to the detection that the electrical charge level is less than or equal to the reference signal.

10. The method of claim 1, wherein a third reference signal level, higher than the first reference signal level, is used for determining whether the electrical charge storing unit has been charged during a period in which the terminal is not in operation.

11. A mobile radio communication terminal, comprising:

a plurality of functional units;

a power supply unit for providing a sole source of electrical charge to the functional units;

a sensing means for detecting a level of electrical charge in the power supply unit and for generating a matched measuring signal corresponding to the level of electrical charge in the power supply unit;

a reference value selector for selecting a first reference signal level for an electrical charge reference signal if the reserve power in the electrical charge storing unit is to be reserved and selecting a second, lower reference signal level for the electrical charge reference signal if the reserve power is to be used, the reference value selector generating the electrical charge reference signal in accordance with the selected reference signal level for indicating whether reserve power in the electrical charge storing unit is to be reserved or used; and a comparing means for determining a difference between the matched measuring signal and the electrical charge reference signal.

12. The mobile radio communication terminal of claim 11, wherein the sensing means includes an amplifier for generating the matched measuring signal corresponding to the level of the detected electrical charge.

13. The mobile radio communication terminal of claim 11, wherein the comparing means generates a difference signal indicative of the difference between the matched measuring signal and the electrical charge reference signal.

14. The mobile radio communication terminal of claim 13, further comprising a control unit receiving the difference signal, the control means determining whether reserve power in the electrical charge storing unit is to be reserved or used based, at least in part, on said difference signal.

15. The mobile radio communication terminal of claim 11, further comprising a control unit for controlling the selection by the reference value selector of the first reference signal level or the second reference signal level based, at least in part, on information stored in the terminal indicating whether reserve power in the electrical charge storing unit is to be reserved or used.

16. The mobile radio communication terminal of claim 11, further comprising a control unit for directing the reference value selector to select the second reference signal level in response to an indication from a user of the terminal that the reserve power is to be used and to select the first reference signal level in response to an indication from a user of the terminal that the reserve power is to be reserved.

17. The mobile radio communication terminal of claim 11, further comprising a control unit for terminating operation of the terminal based at least in part on the difference between the matched measuring signal and the electrical charge reference signal.

18. The mobile radio communication terminal of claim 11, wherein said functional units include an antenna unit, a radio unit, a control unit, a keypad unit, and a display unit.

19. The mobile radio communication terminal of claim 18, wherein the control unit sends instructions causing the display unit to display a query querying a user of the terminal whether the reserve power should be used, said query displayed in response to a detection that the difference between the matched measuring signal and the electrical charge reference signal is less than or equal to zero.

20. The mobile radio communication terminal of claim 18, wherein said functional units further include a data storage unit and a control program storage unit.

21. The mobile radio communication terminal of claim 20, wherein the data storage unit includes a conversion table for converting between a reserved conversation time and a matched measuring signal corresponding to the reserved conversation time to allow a user of the terminal to select a desired conversation time to be reserved.

22. The mobile radio communication terminal of claim 11, wherein a third reference signal level, higher than the first reference signal level, is used for determining whether the electrical charge storing unit has been charged during a period in which the terminal is not in operation.

23. A mobile radio communication terminal, comprising:
   a power supply unit for providing a sole source of electrical charge in the terminal;
   a control unit; and
   a blocking means connected to the control unit for preventing a user from utilizing a preselected amount of reserve power until after the user enters a correct unlocking code.

24. The mobile radio communication terminal of claim 23, wherein the blocking means includes a comparator for making a comparison between a preprogrammed, correct unlocking code and a user-entered code, the comparator generating an approval signal when the correct unlocking code matches the user-entered code and sending the approval signal to the control unit.

25. The mobile radio communication terminal of claim 24, wherein the control unit allows the user to utilize the reserve power in response to the approval signal.

26. The mobile radio communication terminal of claim 24, further comprising a memory for storing the correct unlocking code and the user-entered code.

27. A method for unlocking a preselected amount of reserve power in a mobile radio telecommunication terminal, the reserve power stored in a power supply unit that is the sole storage unit for electrical charge in the terminal, said method comprising the steps of:
   detecting that the amount of power in the power supply unit is less than or equal to a preselected amount of reserve power to be reserved in the power supply unit;
   activating a blocking means to prevent a user of the terminal from utilizing the preselected amount of reserve power;
   receiving a user-entered unlocking code;
   comparing the user-entered unlocking code to a preprogrammed, correct unlocking code;
   allowing the user of the terminal to utilize the reserve power if the user-entered unlocking code matches the preprogrammed, correct unlocking code; and
   discontinuing operation of the terminal if the user-entered unlocking code does not match the preprogrammed, correct unlocking code.

* * * * *

UNITED STATES PATENT AND TRADEMARK OFFICE
CERTIFICATE OF CORRECTION

PATENT NO.    : 6,230,032 B1
DATED         : May 8, 2001
INVENTOR(S)   : Lars Fredrik Liljegren It is certified that error appears in the above-identified patent and that said Letters Patent is hereby corrected as shown below:

Column 5,
Line 4, delete "he" replace with -- the --

Drawings,
Delete Fig. 7a, replace with sheet 6/16
Delete Fig. 7b, replace with sheet 7/16

Signed and Sealed this

Sixteenth Day of July, 2002

*Attest:*

JAMES E. ROGAN
*Attesting Officer*     *Director of the United States Patent and Trademark Office*